United States Patent
Kim et al.

(10) Patent No.: US 12,219,626 B2
(45) Date of Patent: Feb. 4, 2025

(54) COMMUNICATION RELATED TO 3GPP PS DATA OFF

(71) Applicant: LG ELECTRONICS INC., Seoul (KR)

(72) Inventors: Laeyoung Kim, Seoul (KR); Myungjune Youn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 526 days.

(21) Appl. No.: 17/638,045

(22) PCT Filed: Aug. 28, 2020

(86) PCT No.: PCT/KR2020/011555
§ 371 (c)(1),
(2) Date: Feb. 24, 2022

(87) PCT Pub. No.: WO2021/040463
PCT Pub. Date: Mar. 4, 2021

(65) Prior Publication Data
US 2022/0287116 A1 Sep. 8, 2022

(30) Foreign Application Priority Data

Aug. 29, 2019 (KR) .................... 10-2019-0106279
Jan. 7, 2020 (KR) .................... 10-2020-0002115

(51) Int. Cl.
*H04W 76/14* (2018.01)
*H04W 88/04* (2009.01)

(52) U.S. Cl.
CPC ............ *H04W 76/14* (2018.02); *H04W 88/04* (2013.01)

(58) Field of Classification Search
CPC ....... H04W 76/14; H04W 88/04; H04W 4/40; H04W 76/22; H04W 92/18; H04W 76/12
See application file for complete search history.

(56) References Cited

U.S. PATENT DOCUMENTS 8,942,626 B2 * 1/2015 Cho ................. H04W 36/0016
370/335
10,171,985 B1 * 1/2019 Czajka, II ............ H04L 67/306
(Continued)

FOREIGN PATENT DOCUMENTS

| WO | 2018031343 | 2/2018 |
|---|---|---|
| WO | 2018067956 | 4/2018 |
| WO | 2018086416 | 5/2018 |

OTHER PUBLICATIONS

International Search Report from PCT/KR2020/011555, dated Nov. 27, 2020.

*Primary Examiner* — Julio R Perez
(74) *Attorney, Agent, or Firm* — BRYAN CAVE LEIGHTON PAISNER LLP

(57) ABSTRACT

One disclosure of the present specification provides a method for performing, by relay UE, communication related to PS Data Off. The method may comprise the steps of: receiving a direct communication request message from remote UE, wherein the direct communication request message includes PS Data Off status information of the remote UE; determining whether or not to establish a protocol data unit (PDU) session for the remote UE, on the basis of the PS Data Off status information of the remote UE; and transmitting a PDU session establishment request message to a network node, on the basis of the determination to the establishing of the PDU session for the remote UE.

12 Claims, 26 Drawing Sheets

(56) References Cited

U.S. PATENT DOCUMENTS

| | | | |
|---|---|---|---|
| 2016/0330603 A1 | 11/2016 | Chuang | |
| 2019/0124713 A1* | 4/2019 | Stattin | H04W 76/19 |
| 2019/0150093 A1* | 5/2019 | Kweon | H04W 76/30 |
| | | | 370/311 |
| 2019/0246253 A1* | 8/2019 | Ryu | H04L 67/04 |
| 2019/0246436 A1 | 8/2019 | Kim | |
| 2019/0350043 A1* | 11/2019 | Huang-Fu | H04W 48/02 |
| 2021/0076301 A1* | 3/2021 | Yu | H04W 48/08 |
| 2022/0124500 A1* | 4/2022 | Liu | H04W 12/08 |
| 2022/0279348 A1* | 9/2022 | Youn | H04W 12/72 |
| 2022/0287116 A1* | 9/2022 | Kim | H04W 76/12 |

* cited by examiner

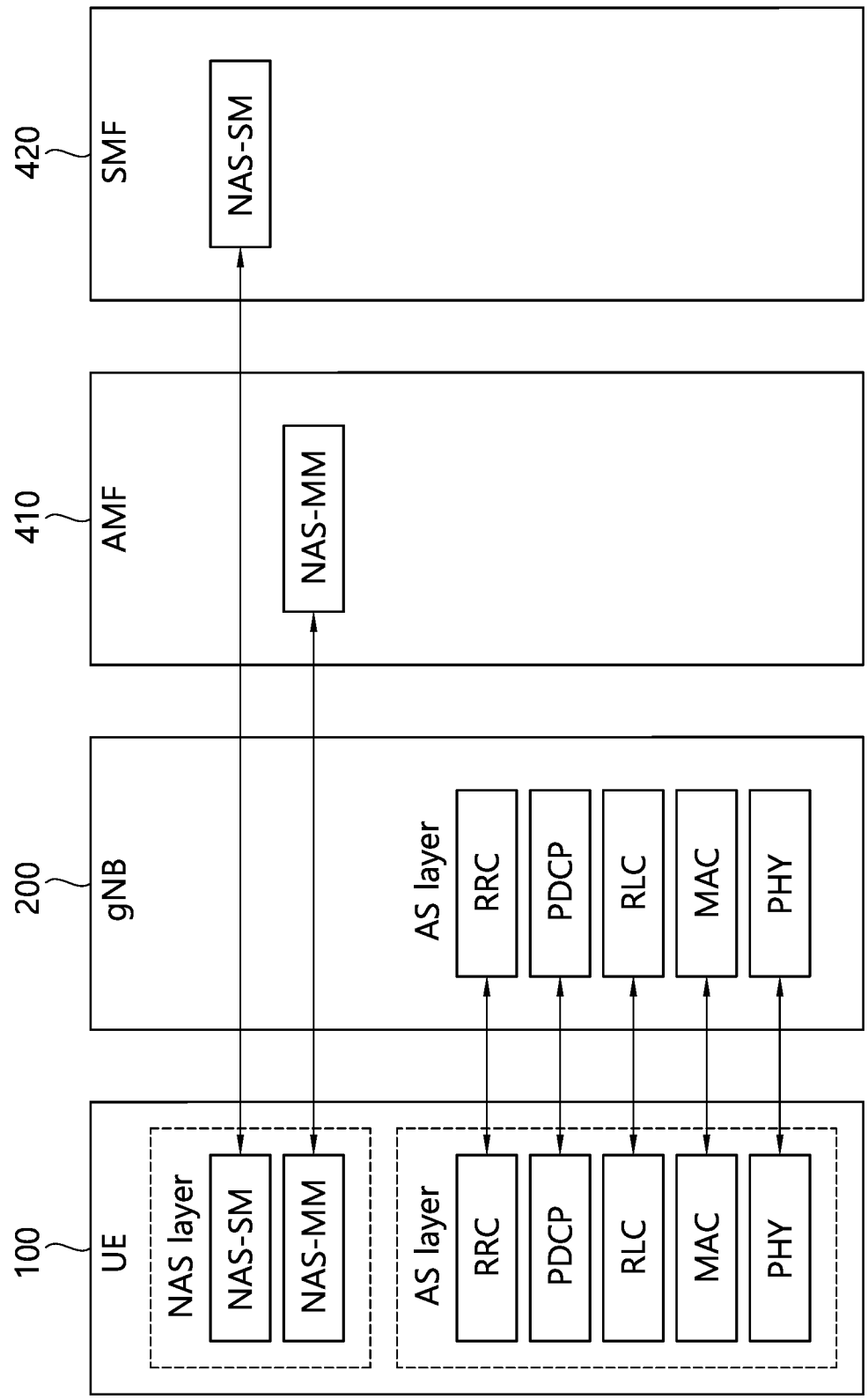

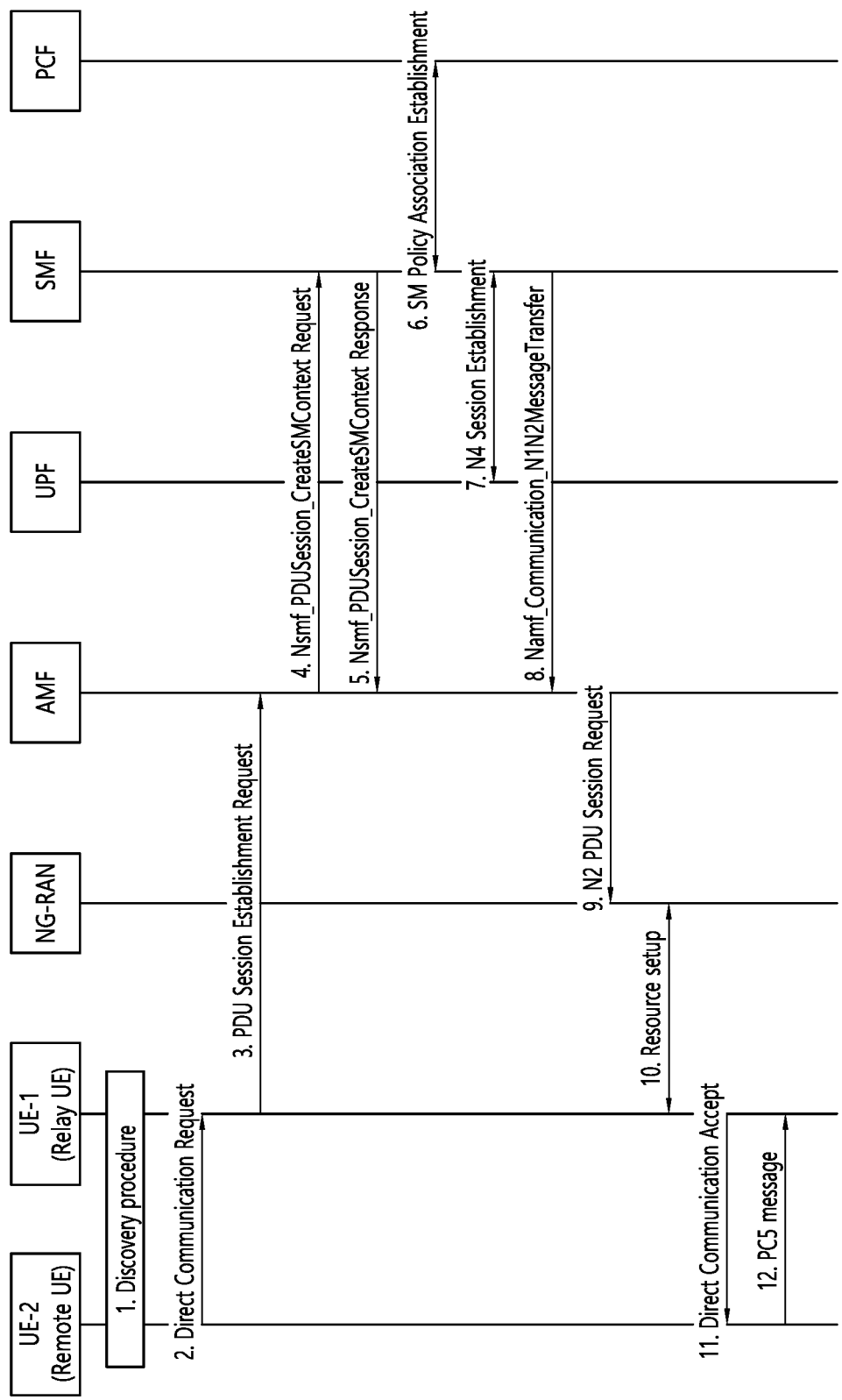

COMMUNICATION RELATED TO 3GPP PS DATA OFF

This application is the National Stage filing under 35 U.S.C. 371 of International Application No. PCT/KR2020/011555 filed on Aug. 28, 2020, which claims priority to Korean Patent Application Nos. 10-2019-0106279 filed on Aug. 29, 2019 and 10-2020-0002115 filed on Jan. 7, 2020, the contents of which are all hereby incorporated by reference herein in their entirety.

TECHNICAL FIELD

The present disclosure generally relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

Layer 2 Relay and Layer 3 Relay are being discussed at 5GS. When the Remote UE is connected to the network through a Layer 2 Relay (ie, Layer-2 UE-to-Network Relay), the Remote UE may transmit NAS messages and RRC messages to the network through the Layer 2 Relay UE, and the Remote UE may receive NAS messages and RRC messages from the network through 2 Relay UEs. On the other hand, when the Remote UE is connected to the network through a Layer 3 Relay (ie, Layer-3 UE-to-Network Relay), the Remote UE cannot transmit NAS messages and RRC messages to the network through the Layer 3 Relay UE, or the Remote UE cannot receive NAS messages and RRC messages from the network through the Layer 3 Relay UE.

In EPS, UE-to-Network Relay did not support Packet Switch (PS) Data Off function of Remote UE. In EPS, since the UE-to-Network Relay was developed for a Public Safety service, it was not necessary to consider the PS Data Off of the Remote UE.

Meanwhile, in 5GS, the application of UE-to-Network Relay to various services (eg, IoT, Vehicle to Everything (V2X), wearables, Industrial Internet of Things (IIoT), etc.) as well as public safety services is being discussed. In addition, in 5GS, a method of using a UE-to-Network Relay for coverage extension is also being considered. Therefore, since the use of UE-to-Network Relay for various services is considered in 5GS, it is necessary to consider a method for supporting the PS Data Off function of the Remote UE.

However, since a method for supporting the PS Data Off function of the Remote UE has not been discussed in the prior art, there is a problem that the Relay UE and/or the network cannot support the PS Data Off function even if the Remote UE wants to use the PS Data Off function.

SUMMARY

Accordingly, a disclosure of the present specification has been made in an effort to solve the aforementioned problem.

In order to solve the above problems, one disclosure of the present disclosure provides a method for a relay UE to perform communication related to PS Data Off. The method includes receiving a direct communication request message from a Remote UE, the direct communication request message including PS Data Off state information of the Remote UE; determining whether to establish a PDU session for the Remote UE based on the PS Data Off state information of the Remote UE; and transmitting a PDU session establishment request message to the network node based on the determination to establish the PDU session for the Remote UE.

In order to solve the above-mentioned problem, one disclosure of the present specification provides a method for a Remote UE to perform communication related to PS Data Off. The method includes transmitting a direct communication request message to a relay UE, the direct communication request message including PS Data Off status information of the Remote UE; and receiving a response message to the direct communication request message from the Relay UE.

In order to solve the above-mentioned problems, one disclosure of the present specification provides a Relay UE for performing communication related to PS Data Off. The Relay UE includes at least one processor; and at least one memory to store instructions and operably electrically connectable to the at least one processor. The operations performed based on the command being executed by the at least one processor include: receiving a direct communication request message from a Remote UE, the direct communication request message including PS Data Off state information of the Remote UE; determining whether to establish a PDU session for the Remote UE based on the PS Data Off state information of the Remote UE; and transmitting a PDU session establishment request message to the network node based on the determination to establish the PDU session for the Remote UE.

In order to solve the above-mentioned problems, one disclosure of the present specification provides a Remote UE for performing communication related to PS Data Off. The Remote UE includes at least one processor; and at least one memory to store instructions and operably electrically connectable to the at least one processor. Operations performed based on the command being executed by the at least one processor include: sending a direct communication request message to a relay UE, the direct communication request message including PS Data Off status information of the Remote UE; and receiving a response message to the direct communication request message from the Relay UE.

In order to solve the above problems, an apparatus in one mobile communication of the present specification is provided. The apparatus includes at least one processor; and at least one memory to store instructions and operably electrically connectable to the at least one processor. The operations performed based on the command being executed by the at least one processor include: identifying a direct communication request message received from the Remote UE, the direct communication request message including PS Data Off state information of the Remote UE; determining whether to establish a PDU session for the Remote UE based on the PS Data Off state information of the Remote UE; and generating a PDU session establishment request message based on the determination to establish a PDU session for the Remote UE.

A non-volatile computer-readable storage medium having recorded thereon instructions, which, when executed by one or more processors, cause the one or more processors to: identify a direct communication request message received from a Remote UE; The direct communication request message includes PS Data Off status information of the Remote UE; determining whether to establish a PDU session for the Remote UE based on the PS Data Off state information of the Remote UE; and generating a PDU session establishment request message based on the determination to establish a PDU session for the Remote UE.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

BRIEF DESCRIPTION OF THE DRAWINGS

FIG. 4 is another exemplary diagram showing a structure of a radio interface protocol between a UE and a gNB.

FIGS. 11a and 11b show an example of a signal flow diagram according to a first example of the disclosure of the present specification.

DESCRIPTION OF EXEMPLARY EMBODIMENTS

Figure 1:
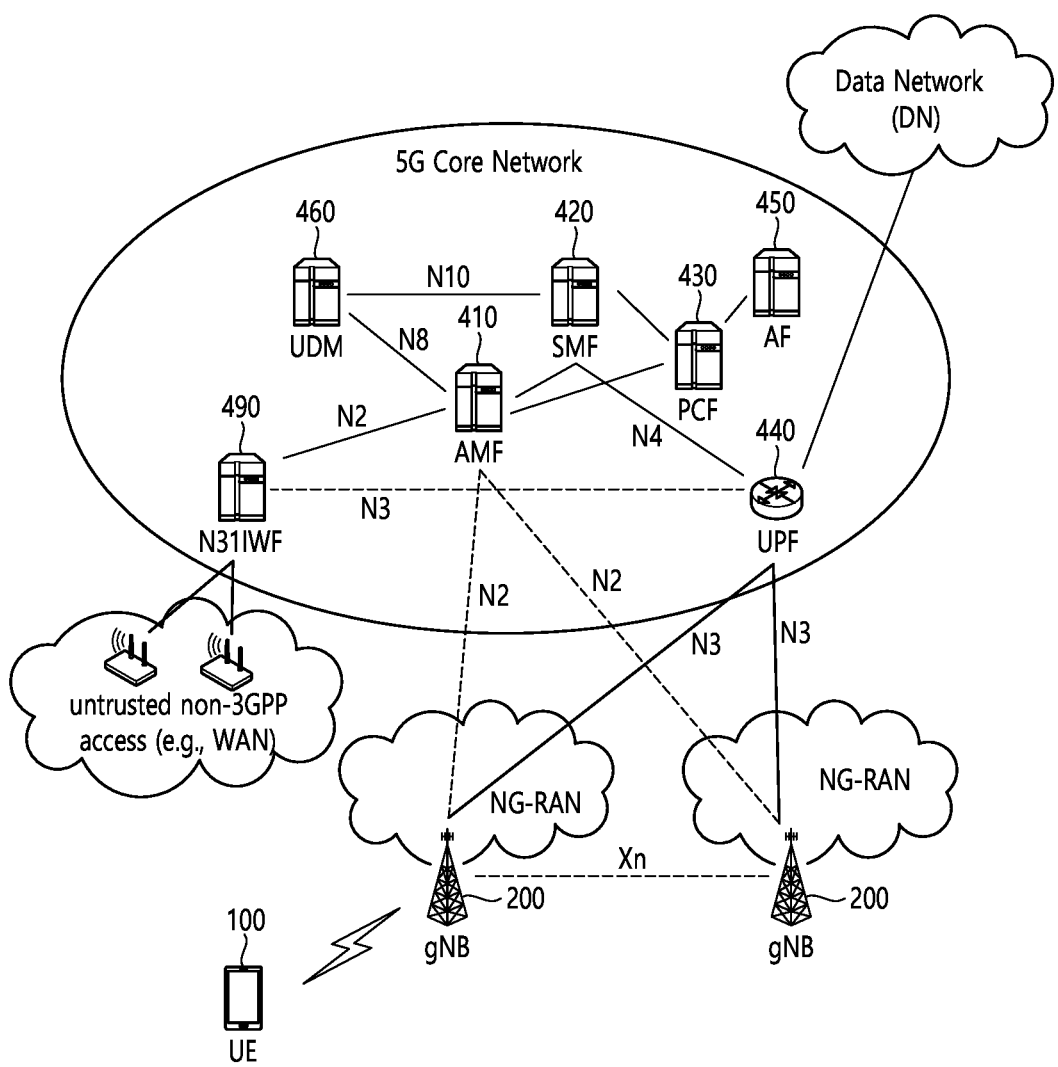
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
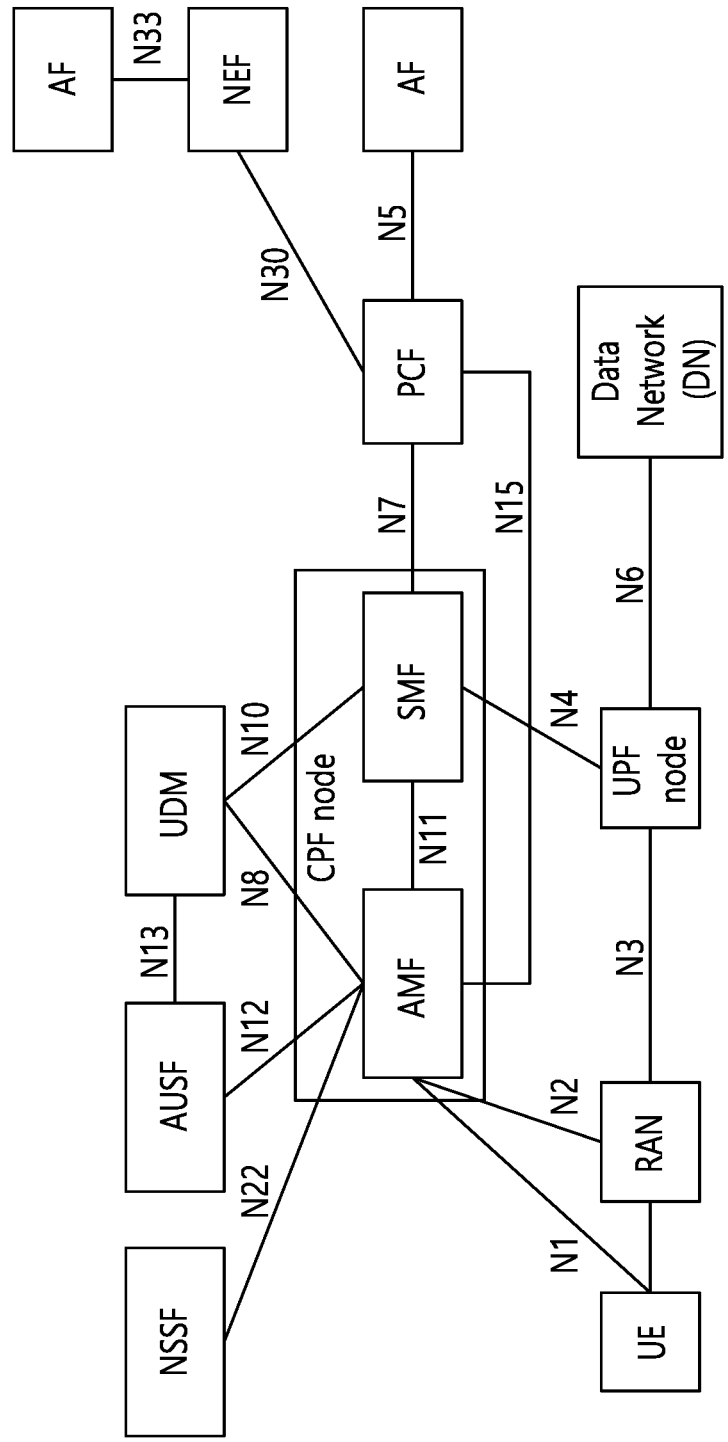
FIG. 2 is an exemplary diagram illustrating a predicted structure of a next generation mobile communication in terms of a node.

FIG. 2 is an exemplary diagram illustrating a predicted structure of a next generation mobile communication in terms of a node.

Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
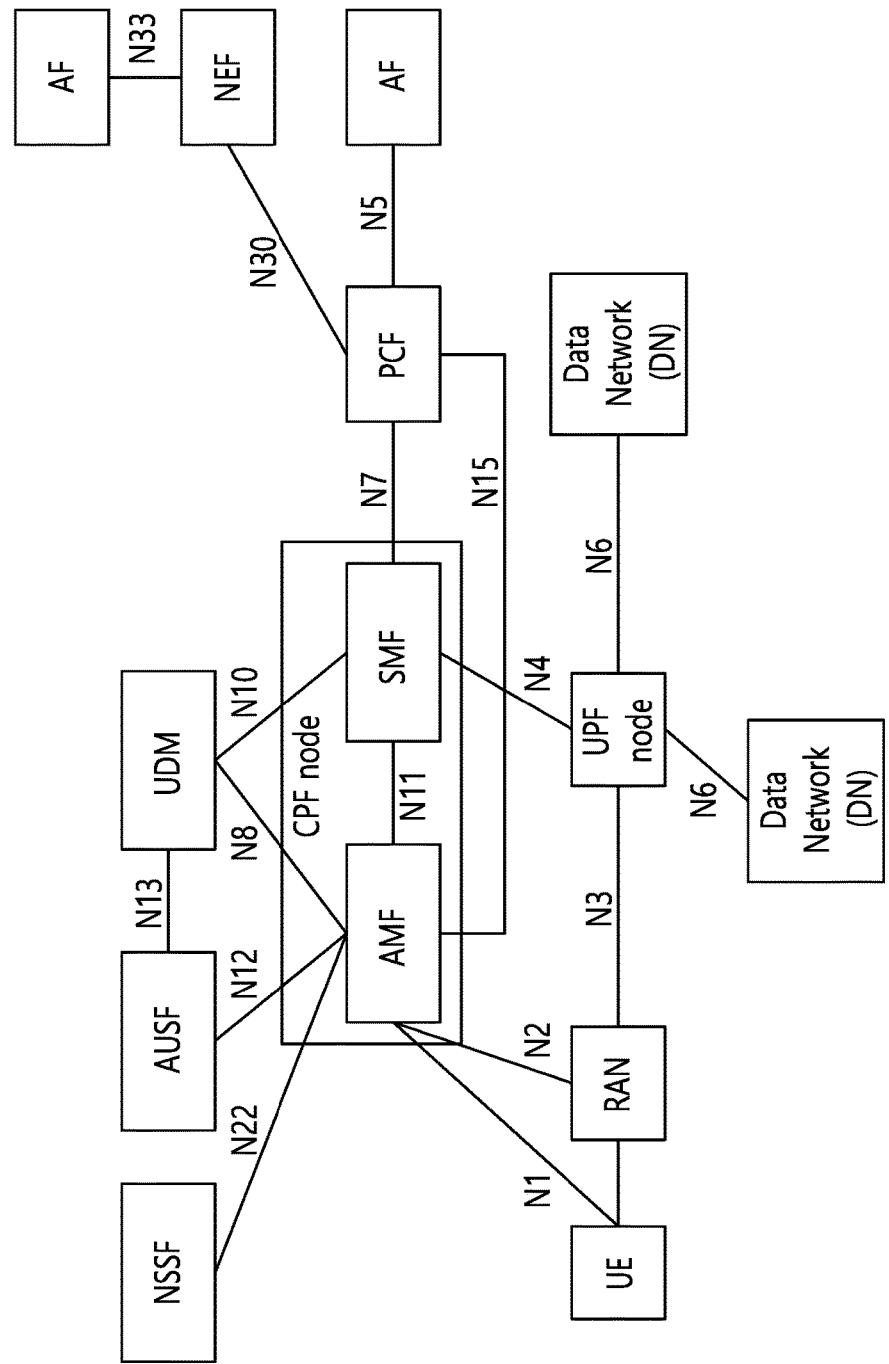
FIG. 3 is an exemplary diagram illustrating an architecture for supporting a concurrent access through two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
  NAS procedures related to AMF include the following.
  Registration management and access management procedures. AMF supports the following functions.
  Secure NAS signal connection between UE and AMF (integrity protection, encryption)
2) The NAS entity for SM performs session management between the UE and the SMF.

The SM signaling message is processed, that is, generated and processed, at an NAS-SM layer of the UE and SMF. The contents of the SM signaling message are not interpreted by the AMF.

In the case of SM signaling transmission,
  The NAS entity for the MM creates a NAS-MM message that derives how and where to deliver an SM signaling message through a security header representing the NAS transmission of SM signaling and additional information on a received NAS-MM.
  Upon receiving SM signaling, the NAS entity for the SM performs an integrity check of the NAS-MM message, analyzes additional information, and derives a method and place to derive the SM signaling message.
  Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

Figure 5A:
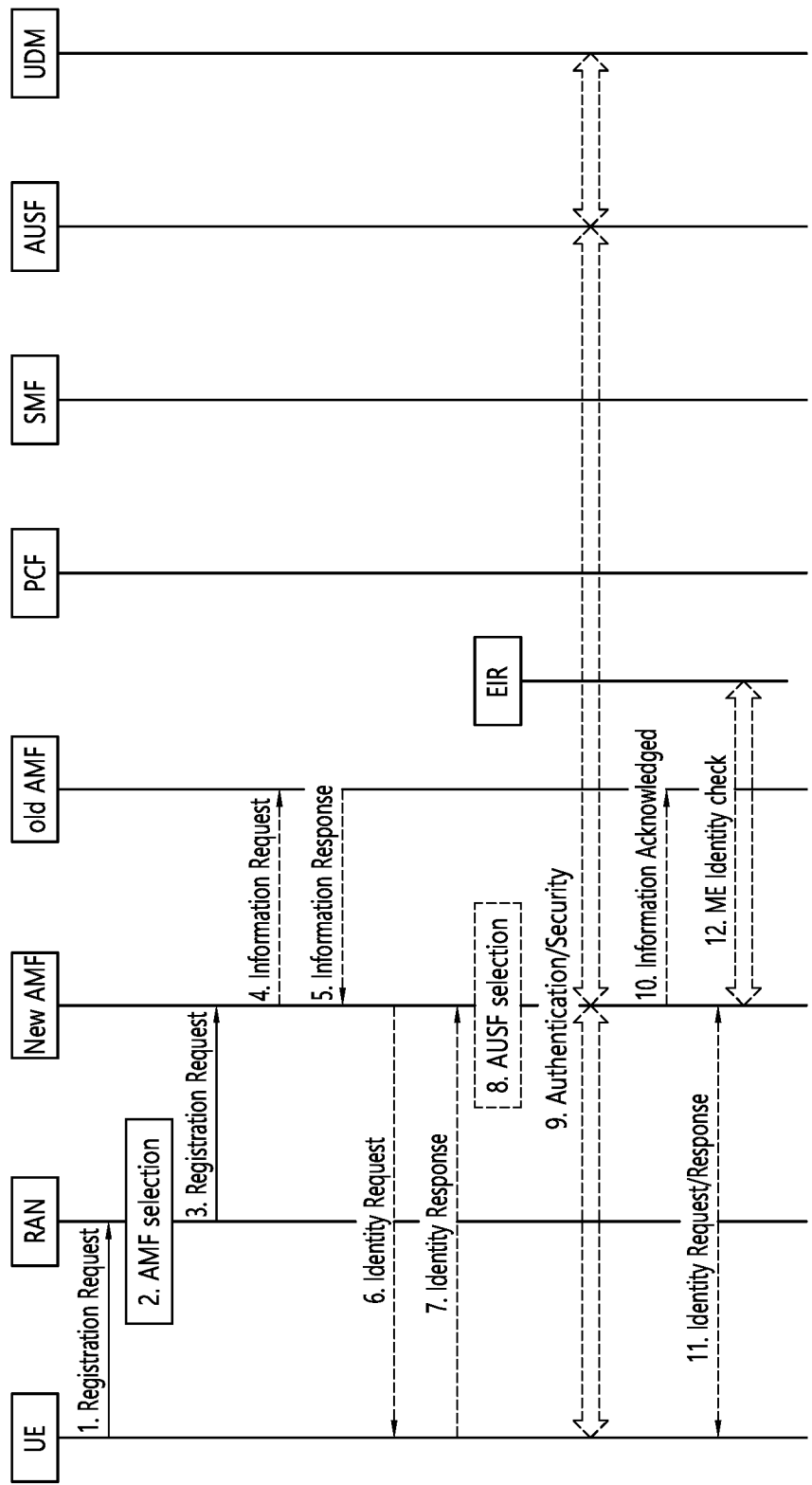
FIGS. 5a and 5b is a signal flow chart showing an exemplary registration procedure.
Figure 5B:
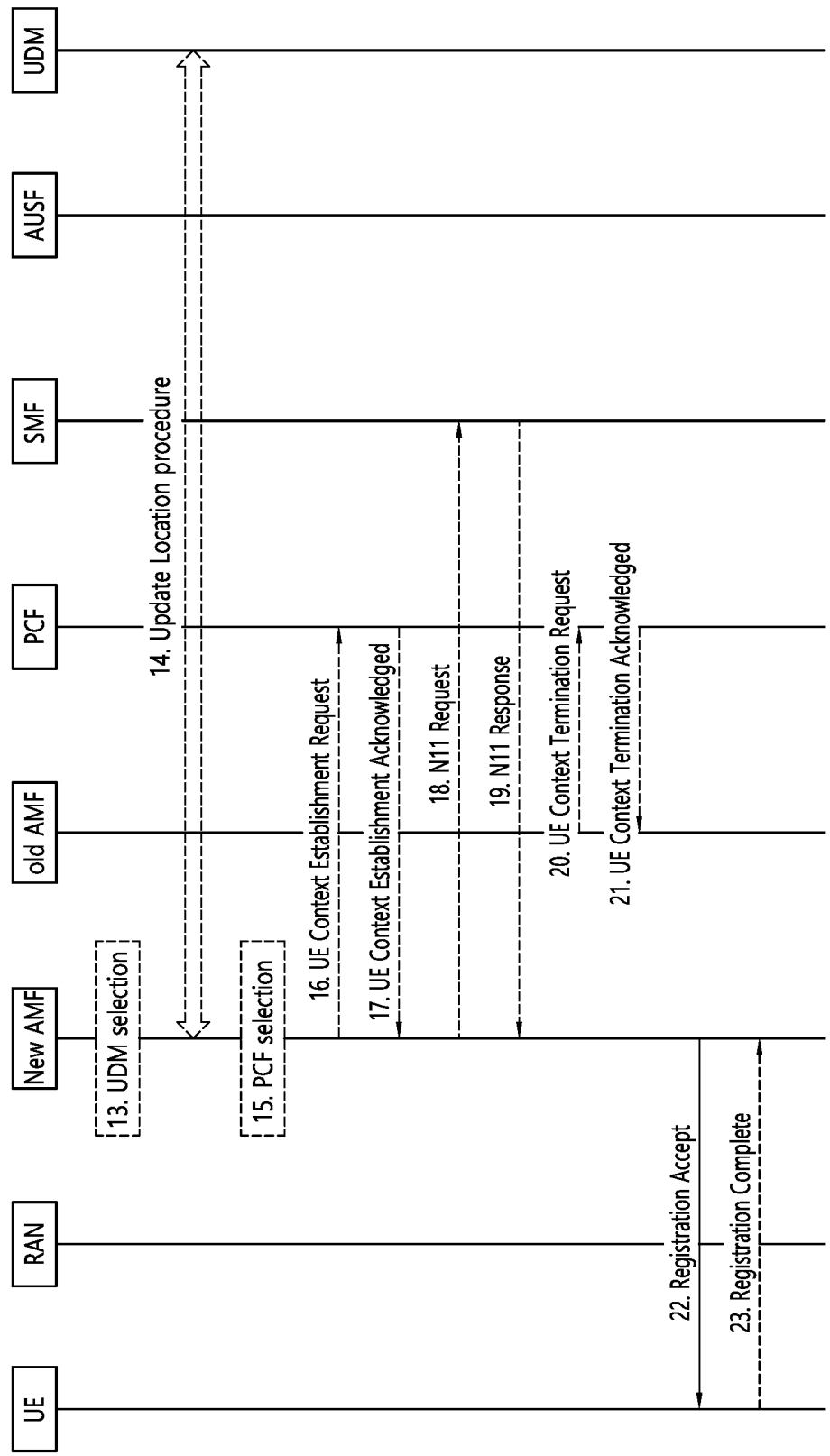

FIGS. 5a and 5b are signal flow charts showing an exemplary registration procedure.

1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU session status, and so on.

In case of a 5G RAN, the AN parameter may include a SUPI or a temporary user ID, a selected network, and NASSAI.

The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer). In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.

The security parameter may be used for authentication and integrity protection.

The PDU session status indicates a PDU session that is available (and previously configured) in the UE.

2) In case the SUPI is included, or in case the temporary user ID does not indicate a valid AMF, the RAN may select an AMF based on a (R)AT and NSSAI.

In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.

3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.

When a 5G-RAN is used, the N2 parameter includes location information related to a cell in which the UE is camping, a cell identifier, and a RAT type.

If the registration type indicated by the UE is a periodic registration update, Process 4 to Process 17, which will be described in detail later on, may not be performed.

4) The newly selected AMF may transmit an information request message to the previous AMF.

In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.

5) The previous (or old) AMF transmits an information response message to the newly selected AMF. The information response message may include SUPI, MM context, and SMF information.

More specifically, the previous (or old) AMF transmits an information response message including SUPI and MM context of the UE.

In case information on an active PDU session is included in the previous (or old) AMF, SMF information including SMF ID and PDU session ID may be included in the information response message of the previous (or old) AMF.

6) In case the SUPI is not provided by the UE, or in case the SUPI is not searched from the previous (or old) AMF, the new AMF transmits an Identity Request message to the UE.

7) The UE transmits an Identity Response message including the SUPI to the new AMF.

8) The AMF may determine to perform triggering of an AUSF. In this case, the AMF may select an AUSF based on the SUPI.

9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI(Session Network Slice Selection Assistance Information) of the allowed NSSAI (Network Slice Selection Assistance Information) to the S-NASSI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
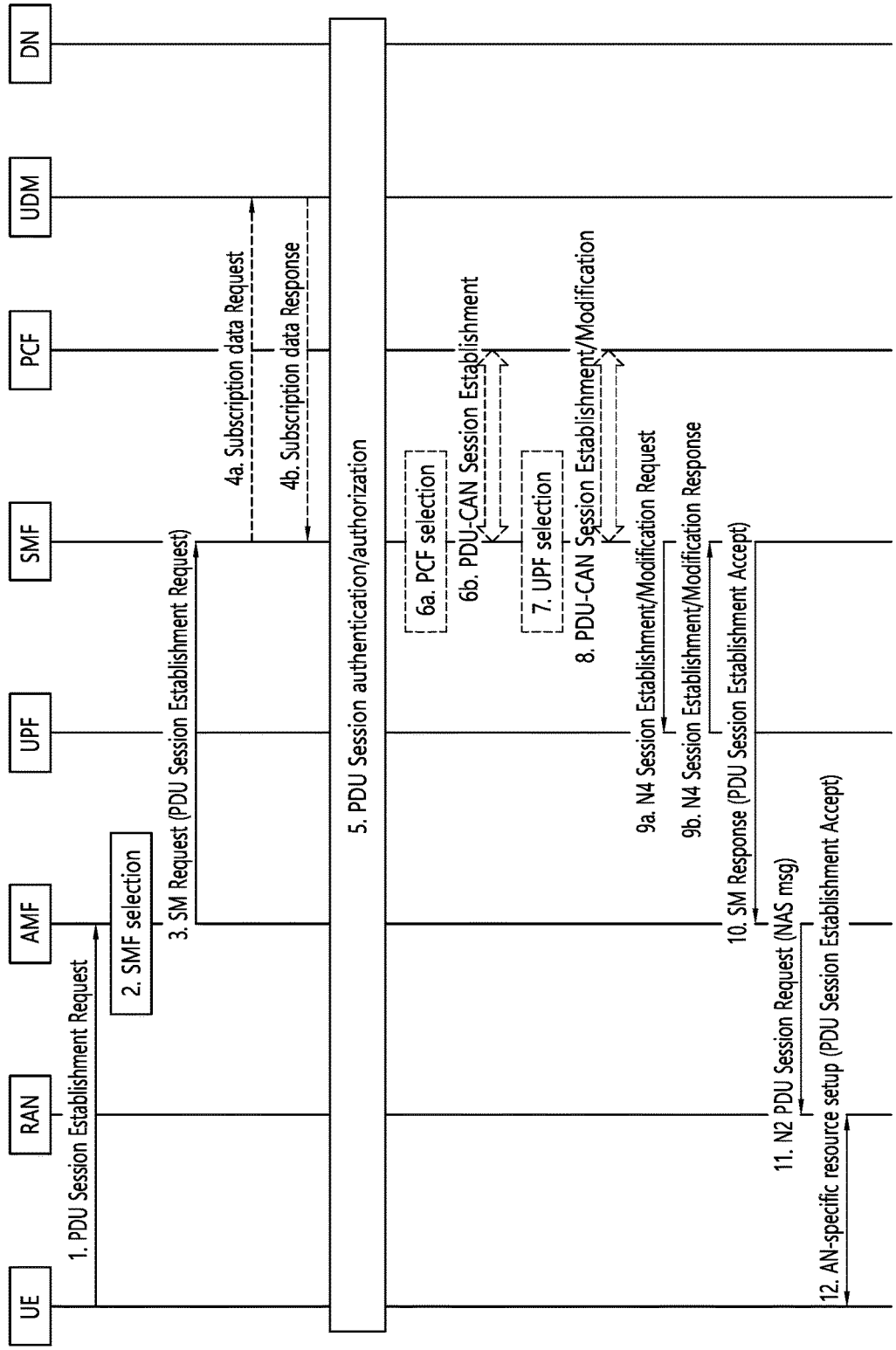
FIGS. 6a and 6b is a signal flowchart illustrating an exemplary PDU session establishment procedure.
Figure 6B:
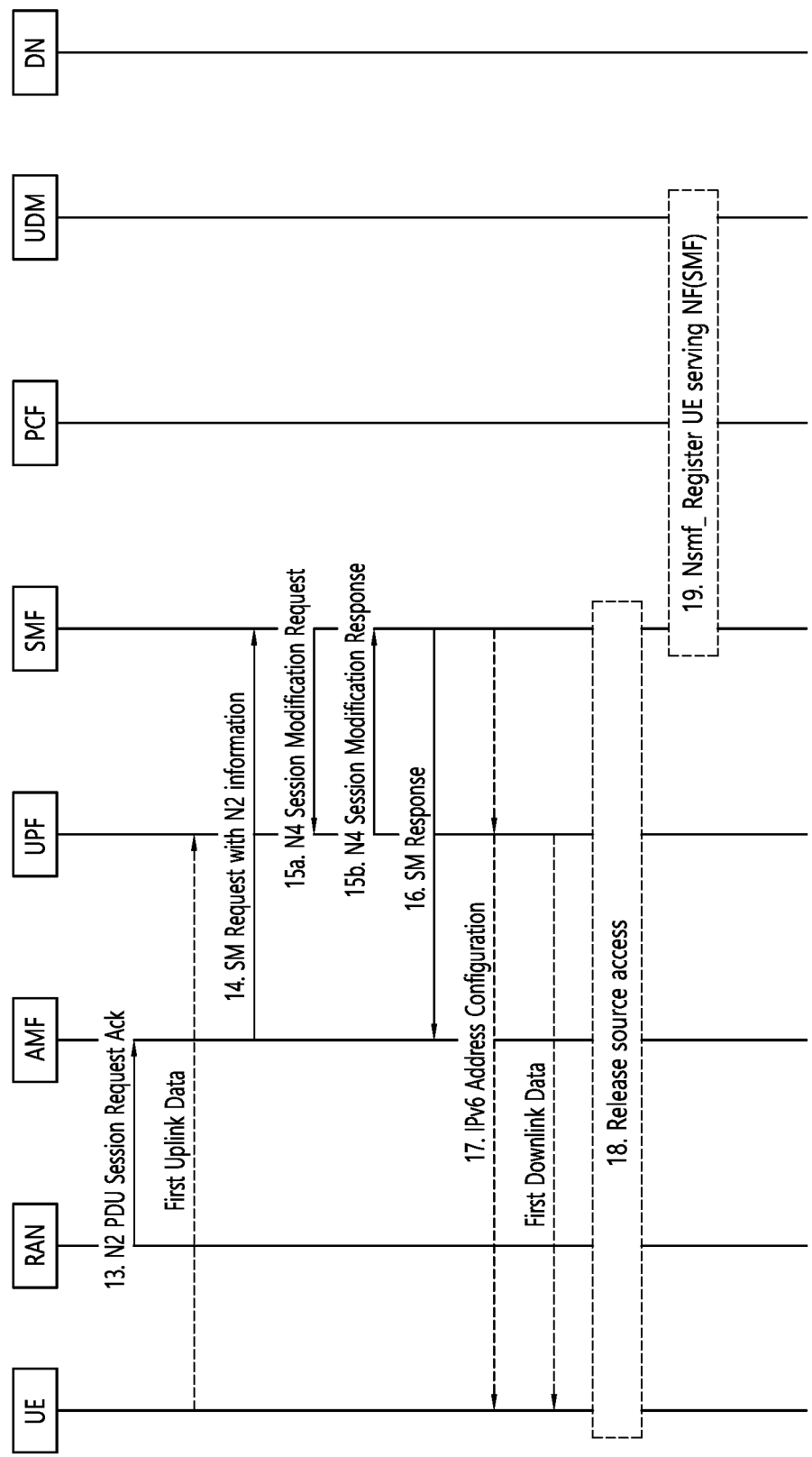

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), Data Network Name (DNN), PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.
  CN Tunnel information: This corresponds to a core network address of an N3 tunnel corresponding to the PDU session.
  QoS Profile: This is used for providing mapping between a QoS parameter and a QoS flow identifier (QFI) to the RAN.
  PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<PDU Session Modification Procedure>

Figure 7A:
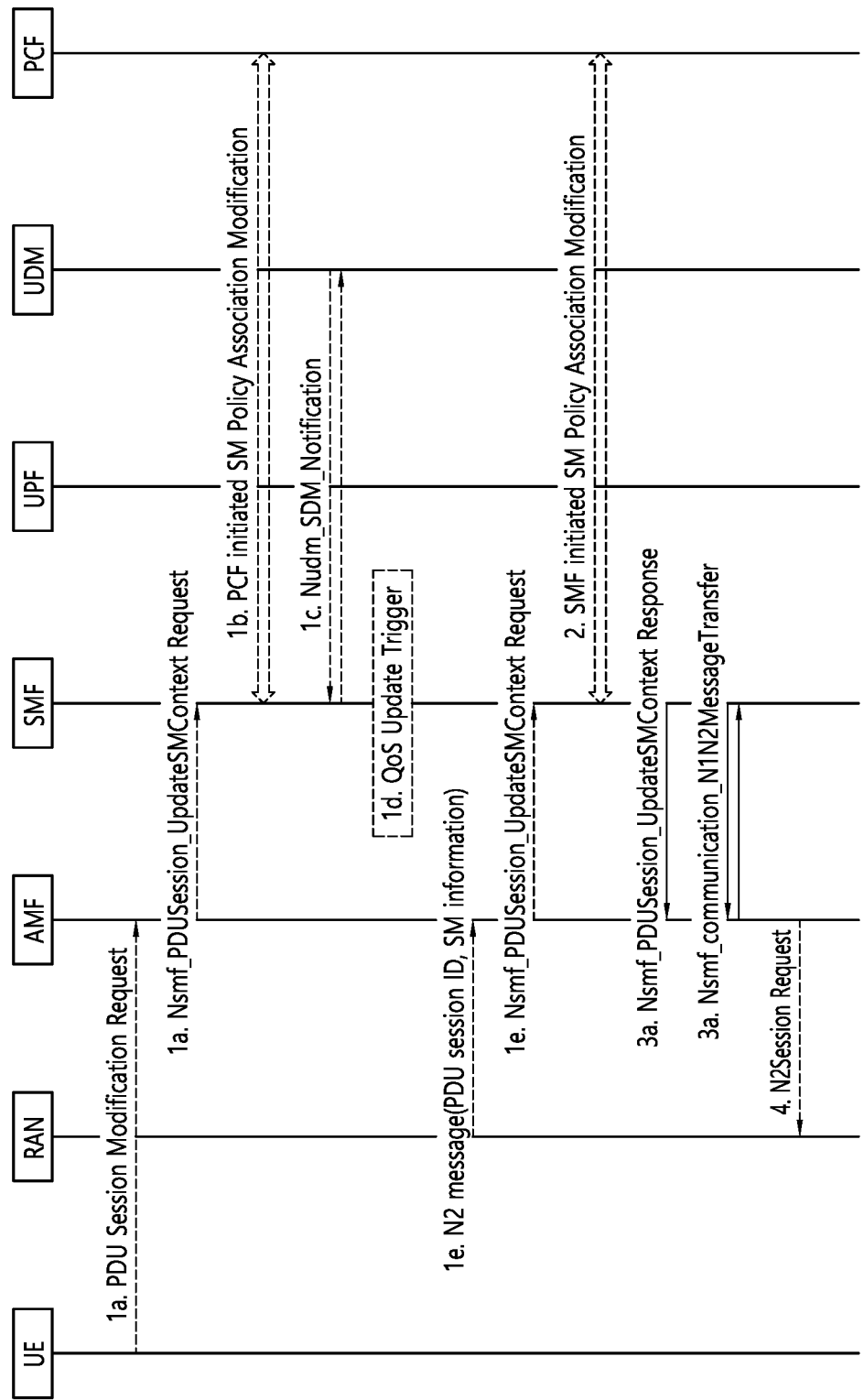
FIGS. 7a and 7b are signal flow diagrams illustrating an exemplary PDU session modification procedure.
Figure 7B:
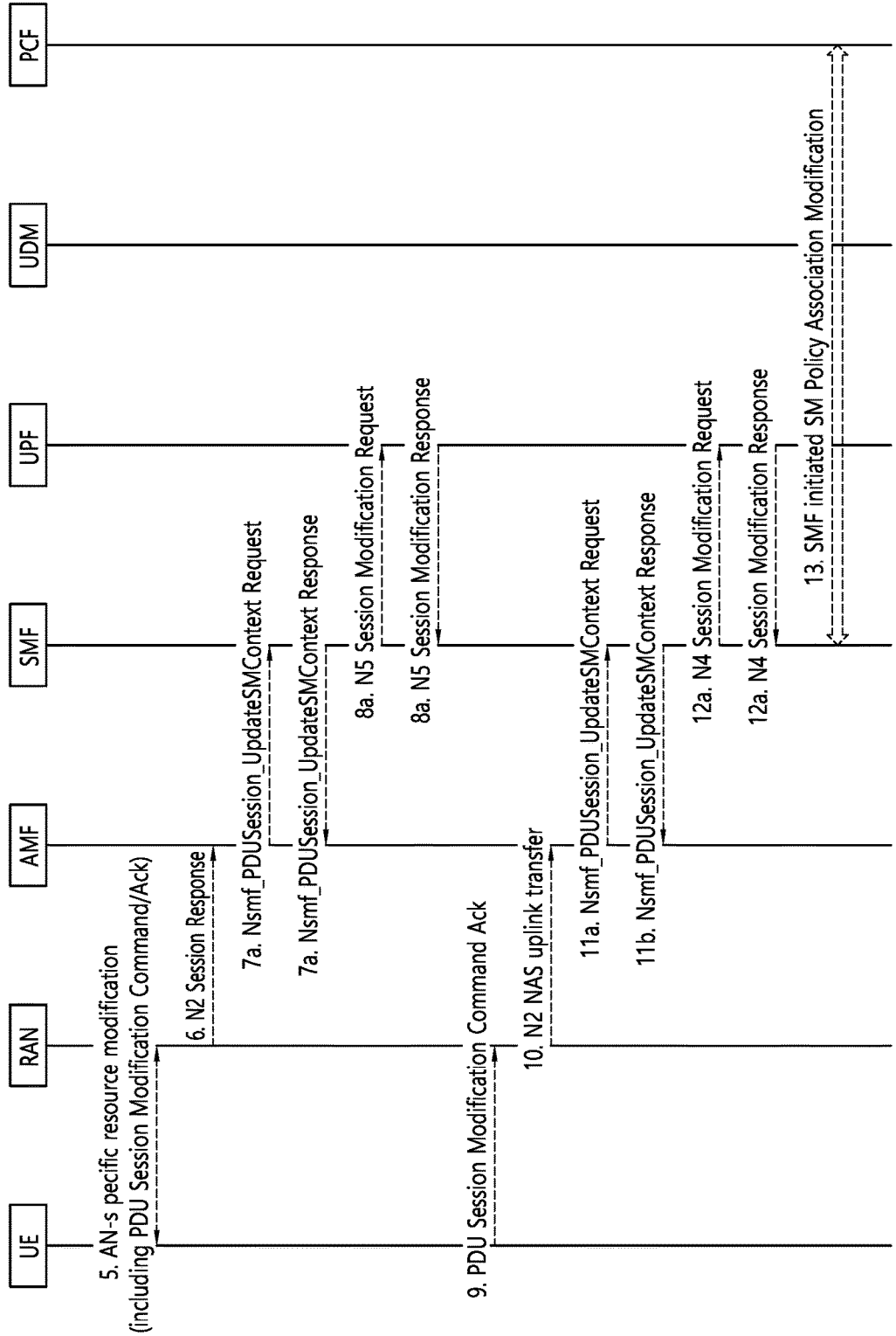

FIGS. 7a and 7b are signal flow diagrams illustrating an exemplary PDU session modification procedure.

The PDU session modification procedure may be used when one or more Quality of Service (QoS) parameters exchanged between the UE and the network are modified.

The signal flow diagram shown in FIGS. 7a and 7b is an example of a PDU session modification procedure, and specifically, a UE or network requested PDU Session Modification procedure (non-roaming case and roaming with local breakeout case) is shown as an example.

An example of a PDU session modification procedure may be triggered by the following exemplary events (steps 1a) to 1e)):

1a) (UE-initiated modification) The UE may initiate a PDU session modification procedure by sending a NAS message.

For example, the UE may send a PDU session modification request message. Here, the NAS message may include an N1 SM container, a PDU session ID, and a UE Integrity Protection Maximum Data Rate. N1 SM container may include PDU session modification request (PDU Session ID, Packet Filters, Operation, Requested QoS, Segregation, 5GSM Core Network Capability, Number of Packet Filters, if Always-on PDU Session is requested, Always-on PDU Session Requested).

Depending on the access type, if the UE was in the CM-IDLE state, a service request procedure may be preceded before this SM-NAS message is transmitted. (Depending on the Access Type, if the UE was in CM-IDLE state, this SM-NAS message is preceded by the Service Request procedure.) (R) AN is delivered to the AMF along with the indication of the user location information (User location Information).

The AMF may invoke the SM context associated with the PDU session update. For example, AMF may call Nsmf_PDUSession_UpdateSMContext. Nsmf_PDUSession_UpdateSMContext may include an SM context ID and an N1 SM container (including a PDU session modification request).

When the UE requests a specific QoS handling for the selected Service Data Flow (SDF), the PDU session establishment request may include a packet filter describing the SDF, the requested packet filter operation (add, modify or delete) for the indicated packet filter, and the requested QoS. The PDU session establishment request may optionally include a Segregation indication. When the UE requests the network to bind the applicable SDF to a distinct and dedicated QoS Flow (eg, even if an existing QoS flow can support the requested QoS), segregation indication may be included in the PDU session establishment request. The network must comply with the UE's request, but the network may bind the selected SDF for the existing QoS flow instead of the UE's request.

Note 1: Only one QoS flow can be used for traffic segregation. When the UE makes a subsequent request for segregation of the additional SDF, the additional SDF is multiplexed in the existing QoS flow used for segregation.

If the UE is outside the availability area of the LADN (Local Area Data Network), the UE does not trigger a PDU session modification procedure for the PDU session corresponding to the LADN.

For a PDU session established in EPS, when the UE first moves from EPS to 5GS, when the UE wants to change the PDU session to an always-on PDU session, the UE may include an indication that an Always-on PDU session is requested in the PDU session modification request message.

1b) (Modification requested by SMF) The PCF may perform a PCF initiated SM Policy Association Modification procedure to notify the SMF of the modification of the policy. The PCF-initiated SM policy association modification procedure may be triggered, for example, by a policy decision or may be triggered when an application function (AF) requests.

1c) (Modification requested by SMF) The UDM may use Subscriber Data Management (SDM) notifications to update the subscription data of the SMF. For example, the SDM notification may be Nudm_SDM_Notification (including Subscription Permanent Identifier (SUPI) and Session Management Subscription Data). The SMF may acknowledge by updating the session management subscription data and returning SUPI and Ack.

1d) (Modification requested by SMF) The SMF may decide to modify the PDU session. Step 1d) may also be triggered from a locally configured policy or (R)AN. Step 1d) may also be triggered when the SMF marks that the UP (User Plane) connection is active and the status of one or more QoS flows has been deleted in 5GC but not synchronized with the UE.

When the SMF receives one of the triggers of steps 1b) to 1d), the SMF may initiate a PDU session modification procedure requested by the SMF.

1e) (AN-initiated modification) Regardless of whether a notification control is set or not, when an AN resource to which a QoS flow is mapped is released, (R)AN must indicate to the SMF. (R) AN may transmit an N2 message (including PDU session ID and N2 SM information) to the AMF. The N2 SM information may include a QoS flow ID (QFI), user location information, and an indication that a QoS flow has been released.

The AMF may call the SM context request associated with the update of the PDU session. For example, the AMF may invoke Nsmf_PDUSession_UpdateSMContext (including SM context ID and N2 SM information).

(AN Initiated Notification Control) When notification control is set for a GBR flow, if (R)AN determines that the QoS target of the QoS flow cannot be met or that the QoS target of the QoS flow can be met again, respectively, (R)AN may transmit an N2 message (including PDU session ID and N2 SM information) to the SMF. The N2 SM information may include an indication that the QoS target of the QFI and QoS flow cannot be met or an indication that the QoS target of the QoS flow may be met again, respectively. The AMF may call the SM context request associated with the update of the PDU session. For example, the AMF may invoke Nsmf_PDUSession_UpdateSMContext (including SM context ID and N2 SM information). When the PCF subscribed to the event, the SMF may report this event to the PCF for each PCC rule for which notification control is set (see step 2). Alternatively, if the dynamic PCC does not apply to this DNN and depends on a locally set policy, the SMF may initiate the PDU session modification procedure requested by the SMF as in the example of step 3b).

2) The SMF may report some subscribed events to the PCF by performing the SMF initiation SM policy association modification procedure. Step 2) may be omitted when the PDU session modification procedure is triggered by step 1b or 1d. If the dynamic PCC is not deployed (deployed), the SMF may apply a local policy to determine whether to change the QoS profile.

Steps 3) to 7) may not be invoked when only an operation (eg gating) in UPF is required for PDU session modification.

3a) For UE-initiated modification or AN-initiated modification, SMF may respond to AMF via PDU session update SM context. For example, the PDU session update SM context may be Nsmf_PDUSession_UpdateSMContext. Nsmf_PDUSession_UpdateSMContext may include N2 SM information (PDU session ID, QFI, QoS profile, session-Aggregate Maximum Bit Rate (AMBR)), and N1 SM container (including PDU Session Modification Command) PDU session modification command may include PDU session ID, QoS rule, QoS rule operation, QoS flow level QoS parameters if necessary for QoS related to QoS rule, Session-AMBR, Always-on PDU Session Requested if Always-on PDU Session is requested.

When PDU session modification has been requested by the UE, in order to modify the PDU session always-on PDU session, the SMF may include an Always-on PDU Session Granted indication in the PDU session modification command. The Always-on PDU session grant indication may be included to indicate whether the PDU session is changed to an Always-on PDU session or not.

The N2 SM information may carry information to be provided by the AMF to the (R)AN. To notify the (R)AN that one or more QoS flows have been added or modified, the N2 SM information may include a QoS profile and a corresponding QFI. The N2 SM information may include only the QFI to notify the (R)AN that one or more QoS flows have been removed. If the PDU session modification is triggered by the (R)AN release of step 1e), the SM information may carry the acknowledgment of the (R)AN release. When the UE requests a PDU session modification for a PDU session without an established user plane resource, the N2 SM information provided to (R)AN may include information for establishing a user plane resource.

The N1 SM container carries the PDU session modification command that the AMF should provide to the UE. In order to notify the UE that one or more QoS rules have been added, removed, or modified, the N1 SM container may include QoS rules, QoS rules and QoS related QoS rules operations, if necessary, QoS flow level QoS parameters and QoS flow level QoS parameter operation.

3b) For the modification requested by the SMF, the SMF may invoke Namf_Communication_N1N2MessageTransfer. Namf_Communication_N1N2MessageTransfer may include N2 SM information (PDU session ID, QFI(s), QoS Profile(s), session-AMBR), and N1 SM container (including PDU session modification command) The PDU session modification command may include PDU session ID, QoS rules, QoS rules and QoS flow-level QoS parameters if necessary for QoS related to QoS rules operation and QoS rules, session-AMBR.

When the UE is in the CM-IDLE state and Asynchronous Type Communication (ATC) is activated, the AMF may update and store the UE context based on Namf_Communication_N1N2MessageTransfer, and steps 4) to 7) may be omitted. For reference, when the ATC mode is activated, paging is not performed for the UE in the IDLE state. When the UE is reachable (eg, when the UE enters the CM-CONNECTED state), the AMF may forward an N1 message to synchronize the UE and the UE context.

4) AMF may transmit an N2 PDU session request message to (R)AN. The N2 PDU session request may include N2 SM information received from the SMF, a NAS message (including a PDU session ID, and an N1 SM container (including a PDU session modification command)).

5) (R)AN may issue an AN specific signaling exchange with the UE related to information received from the SMF. For example, in the case of NG-RAN, RRC Connection Reconfiguration may occur when the UE modifies necessary (R)AN resources related to the PDU session.

(R)AN may acknowledge the N2 PDU session request by sending an N2 PDU session Ack message to the AMF. The N2 PDU session Ack message may include N2 SM information (list of accepted/rejected QFIs, AN tunnel information, PDU session ID, Secondary RAT using data) and user location information. In the case of Dual Connectivity, when one or more QFIs are added to a PDU session, the master RAN node transmits one or more QFIs of these QFIs to the NG-RAN node (the NG-RAN that was not previously involved in the PDU session) node) can be assigned. In this case, the AN tunnel information may include a new N3 tunnel endpoint for the QFI allocated to the new NG-RAN node. Accordingly, when one or more QFIs are removed from the PDU session, the (R)AN node is no longer involved in the PDU session, and the corresponding tunnel endpoint is removed from the AN tunnel information. If the QFI cannot meet the user plane security enhancement information for the corresponding QoS profile (eg, due to the UE Integrity Protection Maximum Data Rate being exceeded), the NG-RAN may reject the QFI.

When the PLMN sets a second RAT usage reporting, the NG-RAN node may provide a RAN usage data report.

7) AMF may deliver N2 SM information and user location information received from AN to SMF through Nsmf_P-DUSession_UpdateSMContext service operation. The SMF may reply to the AMF with an Nsmf_PDUSession_UpdateSMContext response. The N2 SM information may include second RAT usage data.

When (R)AN rejects the QFI, the SMF is responsible for updating the QoS flow level QoS parameters if necessary for the QoS rules at the UE and the QoS flows associated with the QoS rules.

8) The SMF may update the N4 session of the UPF related to the PDU session modification by sending the N4 session modification request message to the UPF (refer to Note 3).

When a new QoS flow is generated, the SMF may update the UPF with UL Packet Detection Rules of the new QoS flow.

Note 2: UL packets with QFI of new QoS flow may be delivered via update.

9) The UE may acknowledge the PDU session modification command by sending a NAS message. The NAS message may include a PDU session ID and an N1 SM container (including PDU session modification command Ack).

10) (R)AN may forward NAS message to AMF.

11) AMF may transmit N1 SM container (including PDU session modification command Ack) and user location information received from AN to SMF through Nsmf_PDUSession_UpdateSMContext service operation.

The SMF may reply using the Nsmf_PDUSession_UpdateSMContext response.

If the SMF-initiated PDU session modification procedure is to delete QoS flows that do not contain QoS flows associated with the default QoS rules (eg, when triggered by PCF), and the SMF does not receive a response from the UE, the SMF marks the state of these QoS flows to be synchronized with the UE.

12) The SMF may update the N4 session of the UPF that is not related to the modification of the PDU session by sending the N4 session modification request message (including the N4 session ID) to the UPF. For a PDU session of the Ethernet PDU session type, the SMF may notify the UPF to add or remove an Ethernet Packet Filter Set and a forwarding rule(s).

Note 3: UPFs affected by the PDU session modification procedure depend on the modified QoS parameters and deployment. For example, when the session AMBR of a PDU session having a UL CL (Uplink Classifier) is changed, only the UL CL may be related. This note can also be applied to step 8).

13) When the SMF interacts with the PCF in step 1b) or 2), the SMF may perform the SMF-initiated SM policy association modification procedure to notify the PCF whether the PCC decision is enforced or cannot be enforced.

The SMF may notify any entity subscribed to the user location information related to the PDU session change.

When step 1b) is triggered to perform an application function effect on traffic routing, the SMF may re-establish the user plane of the PDU session.

<Packet Switch (PS) Data Off>

Data usage of mobile communication networks is increasing due to the explosive increase in users' use of data services. With the explosive increase in data usage of users, a problem of network congestion also occurred, and a problem of users paying a higher service fee according to data service use also occurred. Accordingly, it was discussed how the operator restricts the use of unnecessary background traffic(eg, data generated by an application running in the background in the terminal) of the terminal or data (or signaling) that the user does not want. In this way, PS Data Off was introduced in EPS and 5GS.

The PS Data Off function may be configured by a terminal (eg, UE) and a core network by HPLMN. When the PS Data Off function is activated by the user, it is possible to prevent transmission and reception of all packet data except for packet data by an exception service (eg 3GPP PS Data Off Exempt Services) is transmitted through a PDN connection (eg, when the terminal communicates in EPS) or a PDU session (eg, when the terminal communicates in 5GS). That is, when 3GPP PS Data Off is activated by a user, prevents all traffic (traffic for all Internet Protocol (IP) packets, Unstructured and Ethernet data) through 3GPP access except for data related to 3GPP Data Off Exception Service (3GPP PS Data Off Exempt Services) (hereinafter also referred to as 'exception service' or 'exempt service').

The 3GPP Data Off exception service may mean a service that is allowed even if 3GPP PS Data off is activated in the UE by the user. The 3GPP Data Off exception service may be a set of operator services. For reference, 5GS supports 3GPP PS Data Off operation in non-roaming scenario and roaming scenario mode.

Examples of 3GPP Data Off exception services are as follows:
 MMTel(Multimedia Telephony) Voice;
 SMS over IMS(IP Multimedia Subsystem);
  USSD(Unstructured Supplementary Services Data) over IMS (USSI: USSD simulation service in IMS);
 MMTel Video;
 particular IMS services not defined by 3GPP, where each such IMS service is identified by an IMS communication service identifier;

Device Management over PS;
IMS Supplementary Service configuration via the Ut interface using XCAP(XML(Extensible Markup Language) Configuration Application Protocol); and
Management of Universal Subscriber Identity Module (USIM) files through packet switching (eg by using the Bearer Independent Protocol)

When the user activates PS Data Off (e.g., when the user activates PS Data Off to block data from being transmitted and received by 4G mobile communication or 5G mobile communication), the UE cannot perform uplink transmission (eg. transmission of Mobile originating (hereinafter referred to as MO) data) and downlink data reception (eg, reception of mobile terminated (hereinafter referred to as MT) data).

Hereinafter, PS Data Off will be described in more detail.

The terminal may inform the network my including the PS Data Off state (activated or deactivated) in of PCO (Protocol Configuration Option) of Attach Request, PDN connectivity Request (per PDN (APN)), Bearer Resource Modification Request (per PDN (APN)) message. The network may inform that it supports PS Data OFF of the corresponding PDN (APN) through Accept, or reject the PS Data OFF.

Even if an operation related to PS Data Off is performed between the terminal and the network, for the exemption service defined by the operator, transmission of uplink data and downlink data should be possible even when PS Data Off is activated. This exempt service list may be provided in advance by the operator's network to the terminal through a Management Object (NAS configuration MO or new MO configuration) via Open Mobile Alliance Device Management (OMADM) or through USIM.

In other words, when the user activates PS Data Off, the terminal cannot perform uplink data transmission to the PDN associated with the service except for the services included in the exempt service list. Activation or deactivation of PS Data Off can generally be set by the user.

The list of 3GPP Data Off exemption services for the UE can be set up to two, and this list can be provided to the UE through device management (Device Management) or UICC provisioning (provisioning) by HPLMN (Home PLMN). If two lists are configured for the UE, one list is valid for the UE camping in the HPLMN, and the other list may be valid for any VPLMN in which the UE roams. If only one list is established for the UE, without an indication of which PLMN this list is applicable for, this list may be valid for the home PLMN and any PLMN to which the UE intends to roam.

Note 1: The operator must ensure the list of 3GPP Data Off exemption service provided to the UE and established in the network.

While the PDU session establishment procedure requested by the UE is performed, the UE may report its 3GPP PS Data Off state to the (H-)SMF by including its 3GPP PS Data Off state in the PCO (Protocol Configuration Option).

Note 2: Operation of the UE reporting 3GPP PS Data OFF status during the UE requested PDU session establishment procedure can be applied to a scenario an over occurs, can also be applied to scenario in which handover to 3GPP access occurs while the UE is connected only through non-3GPP access, after the user activates/deactivates 3GPP PS Data Off.

When 3GPP PS Data Off is activated, the UE blocks uplink transmission of uplink IP packets, unstructured and Ethernet data based on a list of pre-configured 3GPP Data Off exemption services.

The UE shall immediately report the change of the UE's 3GPP PS Data Off to the PCO using the UE-initiated (requested by the UE) PDU session modification procedure. This is also applied to the scenario in which the 3GPP PS Data Off state is changed while the inter-RAT mobility scenario to the NG-RAN and the session management back-off timer are running. When the UE is located in the Non-Allowed Area (or the UE is not located in the Allowed Area), the UE may immediately report a change in the 3GPP PS Data Off state for the PDU session. For a UE that moves out of the LADN area and the PDU session is still maintained, the UE may immediately report a change in 3GPP PS Data Off status for the PDU session.

Additional operation of SMF for 3GPP Data Off can be controlled by local setting or policy of PCF.

For PDU sessions used for IMS service, 3GPP Data Off exemption service is implemented in the IMS area. The policy set in (H-)SMF/PCF must ensure that these services are always allowed when the UE's 3GPP Data Off state is set to "activated".

As described above, for a UE supporting 3GPP PS data off, a list of 3GPP Data Off exemption services may be configured up to two. The list of exempt services can also be set by the $EF_{3GPPPSDATAOFF}$ USIM file. Here, EF means Elementary File, and $EF_{3GPPPSDATAOFF}$ means EF associated with 3GPP PS data off. An example of a list of two waived services is below:

A) List of 3GPP PS data off exemption services to be used in HPLMN or EHPLMN (Equivalent HPLMN); and B) List of 3GPP PS data off exemption services to be used in VPLMN.

If only the list of A) described above is configured for the UE, this list may also be used in the VPLMN.

If the UE supports 3GPP PS data off, the UE may provide the 3GPP PS data off UE state by including it in the extended PCO IE during the UE requested PDU session establishment procedure and the UE requested PDU session modification procedure.

The network must support 3GPP PS data off.

The UE may indicate a change in the 3GPP PS data off state for the PDU session by using the UE requested PDU session modification procedure.

When the 3GPP PS data off state is "activated", the UE may perform the following exemplary operations:

1) The UE does not transmit uplink IP packets via 3GPP access, with the following exceptions:

1-i) When the UE is in the HPLMN or EHPLMN of the UE, the service specified in the list of 3GPP PS data off exemption services to be used in the HPLMN or EHPLMN;

1-ii) If only the list of 3GPP PS data off exemption services to be used in HPLMN or EHPLMN is configured for the UE, when the UE is in the VPLMN of the UE, the services specified in the list of 3GPP PS data off exemption services to be used in HPLMN or EHPLMN;

1-iii) if the list of 3GPP PS data off exemption services to be used in the VPLMN is configured for the UE, the services specified in the list of 3GPP PS data off exemption services to be used in the VPLMN;

1-iv) the service specified in the EF3GPPPSDATAOFF USIM file; and 1-vi) Uplink traffic according to procedures related to Extensible Markup Language (XML) Configuration Access Protocol (XCAP) over the Ut interface for Manipulating Supplementary Services 2) the UE does not transmit uplink Ethernet user data packets via 3GPP access; and 3) UE does not transmit uplink unstructured user data packet via 3GPP access.

If the 3GPP PS data off state is not "activated", the UE may transmit an uplink user data packet without limitation.

3GPP PS data off does not limit the transmission of uplink user data packets over non-3GPP access.

<Device to Device (D2D) Communication>

On the other hand, hereinafter, D2D communication will be described.

Figure 8:
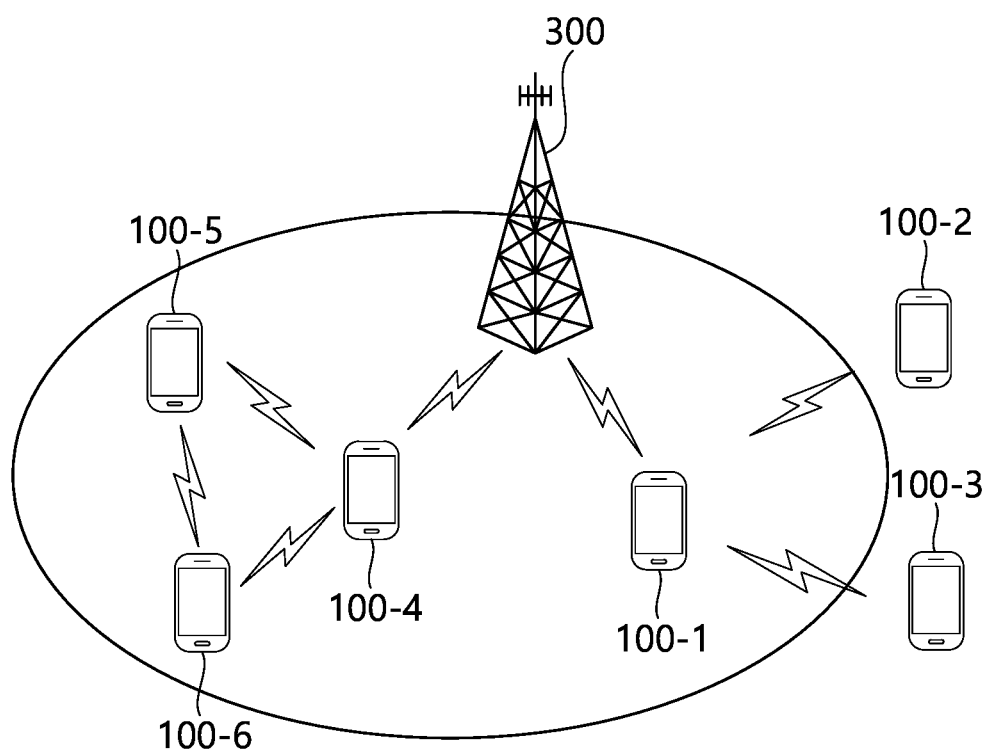
FIG. 8 shows a concept of Device to Device (D2D) communication.

FIG. 8 shows a concept of Device to Device (D2D) communication.

Due to an increase in user requirements for a Social Network Service (SNS), communication between UEs at a physically close distance, i.e., Device to Device (D2D) communication, is required.

In order to reflect the above requirements, as shown in FIG. 8, between UE #1 100-1, UE #2 100-2, UE #3 100-3 or between UE #4 100-4, UE #5 100-5, UE #6 100-6, a method for directly communicating without intervention of a base station (gNB) 300 is being discussed. Of course, it is possible to communicate directly between the UE #1 100-1 and the UE #4 100-4 with the help of the base station (gNB) 300. Meanwhile, UE #4 100-4 may serve as a relay for UE #5 100-5 and UE #6 100-6. Similarly, UE #1 100-1 may serve as a repeater for UE #2 100-2 and UE #3 100-3 that are far away from the cell center.

On the other hand, D2D communication is also called a Proximity Service (ProSe). In addition, a UE performing a proximity service is also referred to as a ProSe UE. A link between UEs used for the D2D communication is also called a sidelink.

The physical channels used for the sidelink include the following.

Physical Sidelink Shared Channel (PSSCH)
Physical Sidelink Control Channel (PSSCH)
Physical Sidelink Discovery Channel (PSDCH)
Physical Sidelink Broadcast Channel (PSBCH)

In addition, there are the following physical signals used in the sidelink.

Demodulation Reference signal (DMRS)
Sidelink Synchronization signal (SLSS)

The SLSS includes a Primary Sidelink Synchronization Signal (PSLSS) and a Secondary Sidelink Synchronization Signal (SSLSS).

Figure 9:
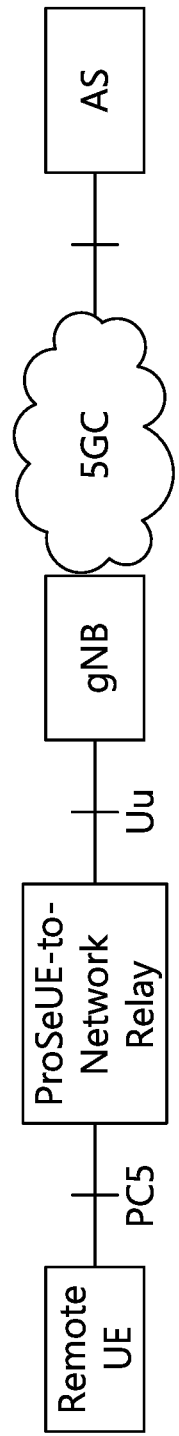
FIG. 9 shows an example architecture of a UE-to-Network Relay.
Figure 10:
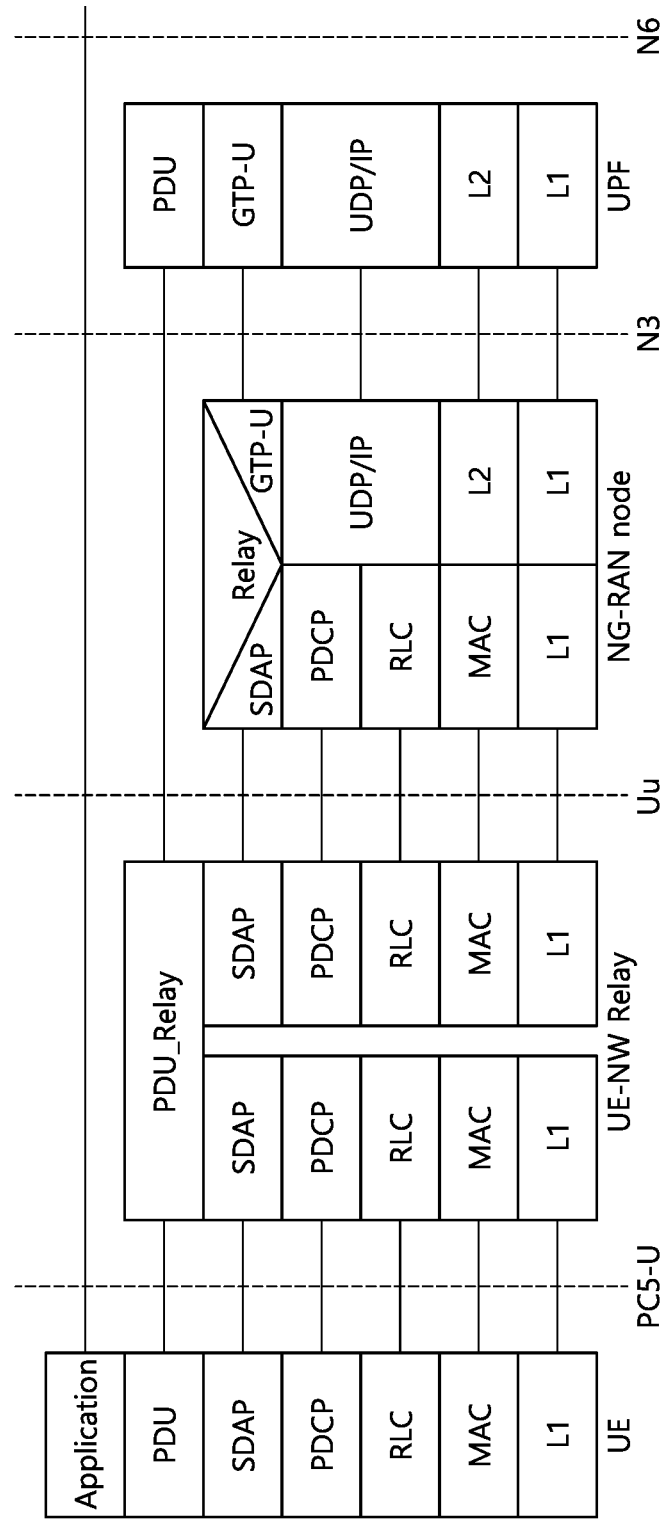
FIG. 10 shows an example of a protocol stack for UE-to-Network Relay.

FIG. 9 shows an example architecture of a UE-to-Network Relay. FIG. 10 shows an example of a protocol stack of for UE-to-Network Relay.

Referring to FIG. 9, UE-to-Network Relay supports the network connection of the Remote UE.

The PC5 link is the interface between the UE and the UE-to-network relay. The Uu link is the interface between the UE-to-network relay and the base station.

If the UE has established a PC5 link with the UE-to-network relay, the UE is considered as a remote UE.

The 5G ProSe UE-to-Network Relay entity (refer to 5G ProSe UE-to-Network Relay in FIG. 9) may provide a function for supporting network connectivity for Remote UEs. UE-to-Network Relay may be used for both public safety services and commercial services (eg, interactive services).

When a UE (eg Remote UE) has successfully established a PC5 link to a 5G ProSe UE-to-Network Relay, the UE (eg Remote UE) will be considered a Remote UE for a specific 5G ProSe UE-to-Network Relay. The Remote UE may be located within NG-RAN coverage or may be located outside NG-RAN coverage.

5G ProSe UE-to-Network Relay may relay unicast traffic (UL and DL traffic) between the Remote UE and the network. The 5G ProSe UE-to-Network Relay shall provide a general function to relay all IP traffic.

For unicast traffic between Remote UEs and 5G ProSe UE-to-Network Relays, One-to-one Direct Communication may be used.

The protocol stack of FIG. 10 may be a protocol stack for Layer-3 UE-to-Network Relay. The UE-to-Network Relay and the Remote UE may perform communication based on the protocol stack as illustrated in FIG. 10. For example, the UE-to-Network Relay may relay unicast traffic (UL and DL traffic) between the Remote UE and the network based on the protocol stack as illustrated in the example of FIG. 10.

Communication between the remote UE and the UE-to-Network Relay is performed as one-to-one direct communication.

II. Problems to be Solved by the Disclosure of the Present Specification

In EPS, a study on Layer-2 UE-to-Network Relay was conducted. An example of a control plane protocol stack and an example of a user plane protocol stack when a Layer-2 UE-to-Network Relay (eg, eRelay-UE) provides a network connection service to a Remote UE (eg, eRemote UE) is shown in FIG. 10 and FIGS. 11a and 11a.

When the Remote UE is connected to the network through a Layer 2 Relay (i.e., Layer-2 UE-to-Network Relay), the Remote UE may transmit NAS messages and RRC messages to the network through the Layer 2 Relay UE, and the Remote UE may receive NAS messages and RRC messages from the network through 2 Relay UEs. When the Remote UE is connected to the network through a Layer 2 Relay (ie, Layer-2 UE-to-Network Relay), the network must perform mobility management for the Remote UE.

On the other hand, when the Remote UE is connected to the network through a Layer 3 Relay (ie, Layer-3 UE-to-Network Relay), the Remote UE cannot transmit NAS messages and RRC messages to the network through the Layer 3 Relay UE, or the Remote UE cannot receive NAS messages and RRC messages from the network through the Layer 3 Relay UE. That is, when the Remote UE is connected to the network through a Layer 3 Relay (ie, Layer-3 UE-to-Network Relay), the Remote UE cannot transmit or receive NAS messages and RRC messages to the network by itself. When the Remote UE is connected to the network through a Layer 3 Relay (ie, Layer-3 UE-to-Network Relay), for the Remote UE, traffic to the Remote UE can be managed by the Layer 3 Relay and/or the network.

In EPS, Layer 3 Relay (ie, Layer-3 UE-to-Network Relay) was introduced, and Layer 2 Relay (ie, Layer-2 UE-to-Network Relay) was not introduced. In 5GS, a method of introducing one or both of Layer 2 Relay (ie, Layer-2 UE-to-Network Relay) and Layer 3 Relay (ie, Layer-3 UE-to-Network Relay) is being discussed.

For reference, in the disclosure of this specification, a Relay UE may mean a Layer-3 Relay UE. Relay UE, Layer-3 UE-to-Network Relay, eRelay-UE (evolved Relay UE), and evolved ProSe UE-to-Network Relay UE may all have the same meaning. In the disclosure of this specification, a Remote UE may mean a Layer-3 Remote UE. Remote UE, Layer-3 UE-to-Network Relay, eRemote-UE (evolved Remote UE), and evolved ProSe Remote UE may all be used with the same meaning.

Meanwhile, in EPS and 5GS, 3GPP PS Data OFF was introduced as described above.

In EPS, UE-to-Network Relay did not support PS Data Off function of Remote UE. In EPS, since the UE-to-Network Relay was developed for a Public Safety service, it was not necessary to consider the PS Data Off of the Remote UE.

Meanwhile, in 5GS, the application of UE-to-Network Relay to various services (eg, IoT, Vehicle to Everything (V2X), wearables, Industrial Internet of Things (IIoT), etc.) as well as public safety services is being discussed. In addition, in 5GS, a method of using a UE-to-Network Relay for coverage extension is also being considered. Therefore, since the use of UE-to-Network Relay for various services is considered in 5GS, it is necessary to consider a method for supporting the PS Data Off function of the Remote UE.

However, since a method for supporting the PS Data Off function of the Remote UE has not been discussed in the prior art, there is a problem that the Relay UE and/or the network cannot support the PS Data Off function even if the Remote UE wants to use the PS Data Off function.

Therefore, in the disclosure of the present specification, it is necessary to discuss a method in which the Relay UE supports the PS Data Off function of the Remote UE.

III. Disclosure of the Present Specification

The disclosures described below in this specification may be implemented in one or more combinations. Each of the drawings shows an embodiment of each disclosure, but the embodiments of the drawings may be implemented in combination with each other.

A method in which the relay UE and/or network supports the PS Data Off function of the Remote UE proposed in the disclosure of this specification may be configured by a combination of one or more operations/configurations/steps described below.

For reference, in this specification, user equipment (UE) and a terminal are used interchangeably. In addition, Relay UE will be described by using terms including UE-to-Network Relay, ProSe UE-to-Network Relay, Relay, Relay UE, UE-NW Relay, eRelay, eRelay UE, eRelay-UE, ProSe Relay, ProSe Relay UE, 5G ProSe Relay UE, 5G ProSe UE-to-Network Relay UE, 5G ProSe UE-to-NW Relay. In addition, Remote UE will be described by using terms including Remote UE, eRemote UE, eRemote-UE, ProSe Remote UE, and ProSe Remote.

Operations described in the disclosure of this specification may be applied to various services (eg, V2X, public safety, IoT, wearables, IIoT, etc.).

The method described in the disclosure of this specification may be applied to all types of PDU sessions (eg, IP type PDU session, Unstructured type PDU session, Ethernet type PDU session).

The method described in the disclosure of this specification is not only applied to a remote UE (eg, a remote UE directly connected to a relay UE) that is provided with a network connection service by one-hop from a relay UE, but also applied to a Remote UE (eg, Remote UEs that are indirectly connected through one or more devices to a Relay UE) that is provided with a a network connection service by a multi-hop from the relay UE.

The method described in the disclosure of this specification can be applied to PS Data Off for non-Internet Protocol Multimedia Subsystem (IMS) (non-IMS)-based services and/or traffic, and can also be applied to PS Data Off for IMS-based services and/or traffic.

In the disclosure of this specification, PC5 may mean NR PC5, LTE PC5, or both NR PC5 and LTE PC5. In the disclosure of the present specification, NG-RAN may mean gNB or both gNB and ng-eNB.

In the disclosure of this specification, the PC5 unicast link may be used in combination with a unicast link, an L3 link, and a Layer-3 link.

1. First Example of the Disclosure of the Present Specification

A first example of the disclosure of the present specification will be described with reference to FIGS. 11a and 11b.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11B:
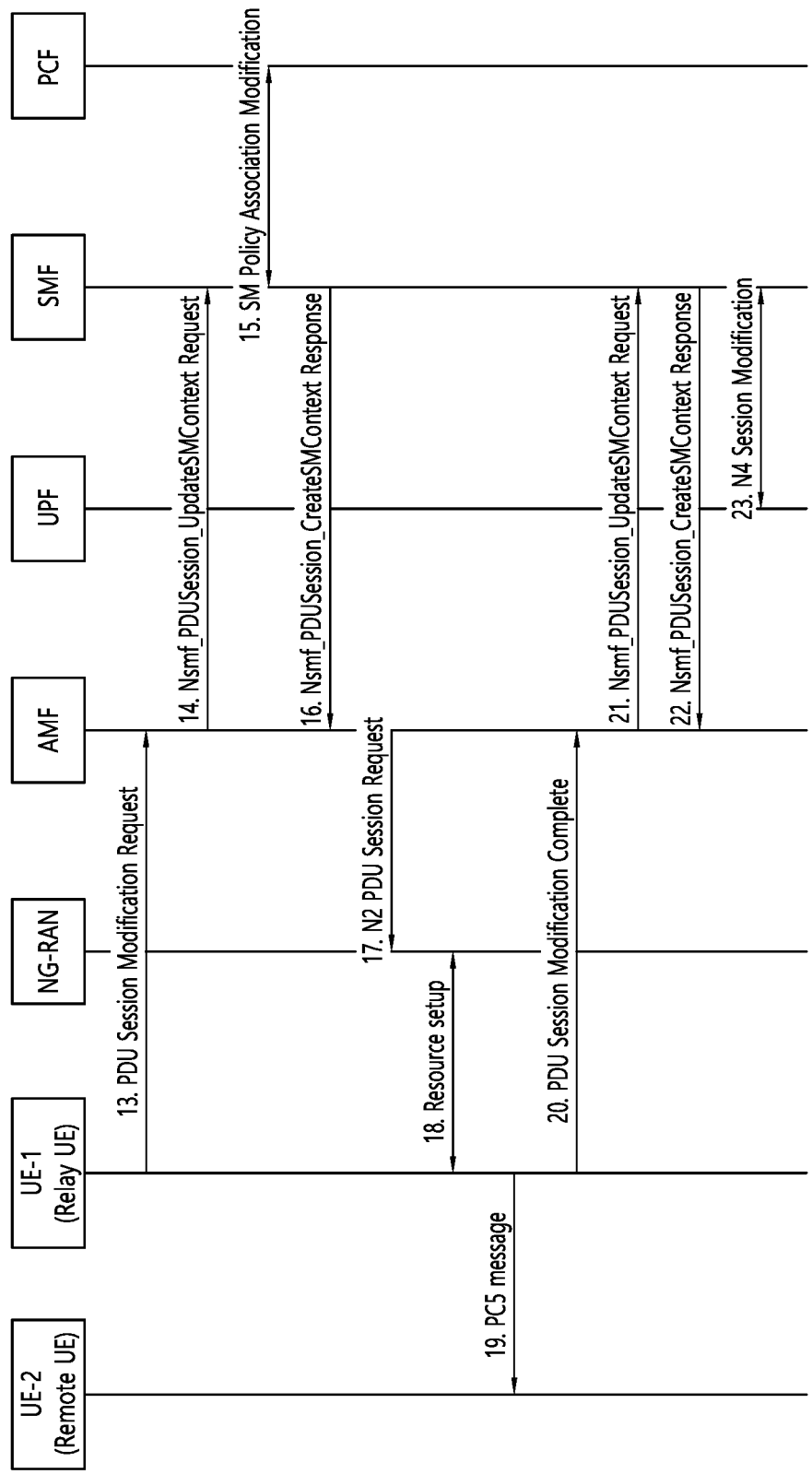

FIGS. 11a and 11b show an example of a signal flow diagram according to a first example of the disclosure of the present specification.

Refer to FIGS. 11a and 11b, UE-2 (Remote UE), UE-1 (Relay UE), NG-RAN (eg, gNB, ng-eNB, etc.), AMF, UPF, SMF, and PCF are illustrated.

In the example of FIGS. 11a and 11b, it is assumed that UE-1 (Relay UE) has performed a registration procedure (eg, FIGS. 5a and 5b) for 5GS.

1) UE-2 (Remote UE) may perform a discovery procedure. For example, UE-2 may perform a discovery procedure for discovering a UE-to-Network Relay in order to receive a network connection service. UE-2 may perform a discovery procedure and may select UE-1 as a UE-to-Network Relay.

The discovery procedure performed by UE-2 may be, for example, Model A discovery or Model B discovery.

The discovery procedure based on Model A discovery may be a discovery procedure including an operation in which the UE announces its existence (eg, information such as "I am here"). For example, a discovery procedure based on Model A discovery may include an operation in which a relay UE (UE-1) announces that it can perform a relay service.

The discovery procedure based on Model B discovery may be a discovery procedure including an operation in which the UE asks for the existence of another UE (eg, information such as "who is there" and/or "are you there"). For example, in the discovery procedure based on Model B discovery, the Remote UE (UE-2) performs an operation to request whether a Relay UE is nearby (eg. request or solicit), thereby requesting a response from the Relay UE (UE-1).

A UE-to-Network Relay (Relay UE) may include a variety of information related to that the Relay UE provides network connection service, in a message for the announcement (eg, a message used to perform a discovery procedure based on Model A discovery) and/or in a message for responding to the request or solicit of the Remote UE in the discovery procedure based on Model B discovery.

For example, various information related to that the UE-to-Network Relay (Relay UE) provides a network connection service may include one or more information among DNN information, network slice-related information, and the type of PDU session that the Relay UE can support (supportable), information on whether a network connection service can be provided to a remote UE by one-hop (or information on whether a network connection service can be provided to a remote UE in how many hops) and/or information on whether to support PS Data Off of a Remote UE (eg, PS Data Off-related operation of the remote UE). Various information related to that the UE-to-Network Relay (Relay UE) provides a network connection service may include a plurality of information by combining a plurality of information among the information such as the examples described above, and a plurality of information may be implicitly included.

For reference, if UE-2 already knows that UE-1 operates as a UE-to-Network Relay (eg, through a method other than the discovery procedure (eg, through a message from the application layer)), or, when UE-2 and UE-1 have already formed a "relationship between relay UE and remote UE" and want to create (or establish) an additional unicast link (eg, if UE-2 or UE-1 wants to create an additional unicast link for a service different from the service used in the existing unicast link), step 1) may be omitted.

2) UE-2 may transmit a Direct Communication Request message to UE-1. For example, UE-2 may transmit a request message (eg, Direct Communication Request message) for unicast link setup to UE-1 in order to receive a network connection service from UE-1.

For example, the direct communication request message may be a PC5-S message. Here, PC5-S may mean control plane signaling performed through a PC5 interface. However, this is only an example, and the direct communication request message may be modified or expanded in a form different from the existing direct communication request message, and a new PC5-S message may be defined and used.

UE-2 may include one or more of the following examples of information in the direct communication request message transmitted to UE-1. That is, UE-2 may transmit to UE-1 a direct communication request message including one or more of the following examples (eg, information of i) to v) below:

i) DNN related information

The DNN-related information may mean information related to a DNN with which UE-2 intends to communicate through the UE-to-Network Relay. The DNN-related information may include network slice-related information.

Even if the direct communication request message does not include DNN-related information, UE-1 may implicitly infer DNN information. For example, when UE-1 provides a network connection service to UE-2 for a specific DNN, UE-2 may infer DNN related information of UE-1 as information related to the specific DNN. As another example, in the discovery procedure performed by UE-1 in step 1), the UE-1 may notify the Layer-2 ID mapped to a specific DNN to UE-2. In this case, UE-2 transmits a direct communication request message to UE-1 using the Layer-2 ID informed by UE-1, such that the UE-2 may infer DNN related information based on the Layer-2 ID notified by UE-1.

ii) PDU session type information

The PDU session type information may be information indicating the type of the PDU session that UE-2 intends to use. The PDU session type information may be one of IPv4, IPv6, IPv4v6, Unstructured (or non-IP), and Ethernet.

iii) Identifier information (or Remote UE ID) indicating the Remote UE

Identifier information (or Remote UE ID) indicating the Remote UE may include one or more of information such as examples of iii-1) to iii-7) below. The description that the identifier information (or Remote UE ID) indicating the Remote UE is information including one or more of information such as examples of iii-1) to iii-7) below, may be applied throughout the disclosure of this specification:

iii-1) SUPI(Subscription Permanent Identifier): SUPI of UE-2;

iii-2) SUCI(Subscription Concealed Identifier): SUCI of UE-2;

iii-3) GPSI(Generic Public Subscription Identifier): GPSI of UE-2;

iii-4) PEI(Permanent Equipment Identifier): PEI of UE-2;

iii-5) MSISDN(Mobile Subscriber Integrated Services Digital Network(ISDN) Number): MSISDN of UE-2;

iii-6) ID usable when UE (eg, UE-2) operates as a Remote UE: For example, an ID that can be used when the UE (eg, UE-2) operates as a Remote UE can be defined as a Specific Identifier. A different ID may be used for each DNN as the Remote UE Specific Identifier of UE-2 (eg, for DNN 1, UE-2 uses Remote UE Specific Identifier 1, and for DNN 2, UE-2 uses Remote UE Specific Identifier 2 may be used), one ID may be used for all DNNs (eg, for all DNNs such as DNN 1 and DNN 2, UE-2 may use Remote UE Specific Identifier 1). In addition, the Remote UE Specific Identifier may include HPLMN information of the UE. In this case, a portion excluding the HPLMN information from the Remote UE Specific Identifier may be in an encrypted form; and iii-7) Application Layer User ID: Application Layer User ID of UE-2.

iv) Information indicating that it is to receive a network connection service: For example, information indicating that it is to receive a network connection service may be information indicating that UE-2 transmitted a direct communication request message to receive a network connection service from a Relay UE (eg, UE-1).

v) PS Data Off status information: this information may mean PS Data Off status information of UE-2. This may be information indicating whether PS Data Off of the Remote UE (UE-2) is activated. For example, the PS Data Off status information of UE-2 may be set to deactivated or activated according to the PS Data Off status of UE-2.

UE-2 may transmit a direct communication request message including one or more of the information (eg, information of i) to v) as in the above example to UE-1.

One or more of the information as in the above example (eg, information of i) to v)) may be information configured or selected by a user of UE-2. Alternatively, one or more of the information as in the above example (eg, information of i) to v)) may be information based on information configured in UE-2. In addition, when the UE operates as a Remote UE, when there is no user input, it may be determined as a default value what value should be set to one or more of the information (eg, information of i) to v)) as in the above example. Alternatively, when the UE operates as a Remote UE, the UE may not ask the user, and the value of one or more of the information (eg, information of i) to v) as in the above example) should be set to a certain value may be set as a default value.

In the disclosure of this specification, the unicast link between the Remote UE and the Relay UE may be interpreted as a PC5 unicast link, a Layer-3 link, a one-to-one link, and the like, and may be used interchangeably.

The direct communication request message transmitted by UE-2 may mean one or more PC5-S messages transmitted by UE-2, in order for the UE-2 to form (or establish) a unicast link with UE-1 (or to complete unicast link formation or to perform unicast link-related communication). When a plurality of PC5-S messages are used for transmission of the direct communication request message, one or more of the information such as the examples (eg, information of i) to v) as in the above example) may included and divided into a plurality of PC5-S messages. The description of this paragraph may be applied throughout the disclosure of this specification.

3) UE-1 may transmit a PDU Session Establishment Request message to the AMF. For example, the UE-1 may determine to create (or establish) a new PDU session for the DNN to which UE-2 wants to be provided with a network connection service, based on the direct reception request message received from UE-2. Based on this determination, the UE-1 may transmit a PDU session establishment request message to the AMF.

The reason UE-1 determines to create (or establish) a new PDU session is that a PDU session corresponding to the DNN (eg, a DNN for which UE-2 wants to be provided with a network connection service) does not yet exist. For example, it is assumed that step 3) is performed on the assumption that a PDU session corresponding to the DNN is not generated among the PDU sessions of UE-1.

The PDU session establishment procedure initiated by the UE-1 transmitting a PDU session establishment request message may be performed in the same manner as in the examples of FIGS. 6*a* and 6*b*. That the PDU session establishment procedure described in the disclosure of this specification is performed in the same manner as in the examples of FIGS. 6*a* and 6*b* may be applied throughout the disclosure of this specification.

The PDU session establishment request message transmitted by UE-1 may include information such as the following examples (eg a) and b)):

a) Identifier information indicating the Remote UE: The identifier information indicating the Remote UE may be based on information received from UE-2 in step 2). In addition, the identifier information indicating the Remote UE may include IP address information used by the Remote UE (eg, UE-2) to receive a network connection service from the UE-to-Network Relay (eg, UE-1).

b) PS Data Off status information of Remote UE: PS Data Off status information of the Remote UE may be based on information received from UE-2 in step 2).

UE-1 may transmit a PDU session establishment request message including a) and b) to the AMF.

a) and b) may be connected to each other. For example, the PS Data Off status corresponding to b) may be connected to the identifier information of a) and may be included in the PDU session establishment request message in a form indicating which UE the the PS Data Off status corresponds to. For example, when UE-1 performs a PDU session establishment procedure for a plurality of UEs (eg, a plurality of Remote UEs), the PDU session establishment request message transmitted by UE-1 may include a) and b), in order to distinguish the PS Data Off status information of each UE among the plurality of UEs from PS Data Off status information of another UE.

The information "a) identifier information indicating the Remote UE" may be included in a NAS message that AMF can interpret and/or a PDU session establishment request message that is a Session Management (SM) NAS message that SMF can interpret.

The information "b) PS Data Off status information of the Remote UE" may be included in a PDU session establishment request message, which is an SM NAS message that SMF can interpret.

In addition, the PDU session establishment request message transmitted by UE-1 may further include information indicating that the PDU session establishment request message is for a Remote UE and/or information indicating that it is related to a relay UE operation. Information indicating that it is for a Remote UE and/or information indicating that it is related to a Relay UE operation may be included in a NAS message that AMF can interpret and/or a PDU session establishment request message that is a Session Management (SM) NAS message that SMF can interpret.

Before performing step 3) (ie, before UE-1 transmits a PDU session establishment request message), UE-1 may check whether UE-1 is capable of providing a network connection service to UE-2 and/or the UE-1 may check with the network whether UE-2 may be provided with a network connection service from UE-1.

Alternatively, this check may be performed together with the PDU session creation (or establishment) procedure. That is, UE-1 may check whether UE-1 can provide a network connection service to UE-2 and/or whether UE-2 is capable of being provided with a network connection service from UE-1, while the UE-1 performs a procedure of creating (or establishing) a PDU session with the network. In this case, the AMF receiving the PDU session establishment request message performs, with UE-1, which is a UE-to-Network Relay, the check procedure and/or authentication procedure for UE-2, which is a Remote UE, based on "a) identifier information indicating the Remote UE". In order to perform such a check procedure and/or authentication procedure, the AMF may obtain the necessary subscriber information (eg, Subscriber information of UE-2, which is a Remote UE) from UDM, UDR, or Network Function storing subscriber information of the Remote UE.

4) The AMF may transmit a PDU session establishment request message to the SMF. For example, the AMF may transmit an Nsmf_PDUSession_CreateSMContext Request message including a PDU session establishment request message to the SMF. The SMF may perform a procedure of checking whether UE-1 can provide a network connection service to UE-2 and/or whether UE-2 can receive a network connection service from UE-1. When the SMF performs such a check, the SMF may perform the check procedure and/or an authentication procedure for UE-1, which is a UE-to-Network Relay, and UE-2, which is a Remote UE, based on "a) identifier information indicating the Remote UE". In order to perform such a check procedure and/or authentication procedure, the SMF may obtain the necessary subscriber information (eg, Subscriber information of UE-2, which is a Remote UE) from UDM, UDR, or Network Function storing subscriber information of the Remote UE, based on "a) identifier information indicating the Remote UE".

In step 3), an example in which the AMF performs the check procedure and/or authentication procedure has been described, and in step 4) an example in which the SMF performs the check procedure and/or authentication procedure has been described, but this is only an example, Another NF (Network Function) may perform the check procedure and/or the authentication procedure. For example, the PCF may perform the check procedure and/or the authentication procedure in step 6) to be described below.

5) The SMF may transmit a response message to the message received in step 4) to the AMF. For example, the SMF may transmit an Nsmf_PDUSession_CreateSMContext Response message to the AMF.

6) SMF can perform SM Policy Association Establishment procedures with PCF.

While the SM Policy Association Establishment procedure is being performed, the SMF may provide the PCF with identifier information of UE-2, which is a Remote UE, and PS Data Off status information of UE-2, based on the PDU session establishment request message received in step 4). The PCF may generate or configure (or set) PCC rules for UE-2, which is a Remote UE, based on PS Data Off status information of UE-2.

For example, if the PS Data Off status of UE-2 is deactivated, the PCF may create or configure (or set) PCC rules for the UE-2, in order to enable all services and/or traffic using the PDU session related to UE-2 be transmitted and received UE-2 and the network. When the PS Data Off status of UE-2 is activated, the PCF may generate or configure (or set) PCC rules for UE-2, in order to enable the services and/or traffic related to the PS Data Off exempt service among the services and/or traffic using the PDU session related to UE-2 to be transmitted and received between network and UE-2.

7) SMF may perform N4 Session Establishment procedure with UPF. The SMF may transmit Remote UE-related information (eg, Remote UE-related information such as a) and/or b) of step 3) to the UPF.

8) The SMF may transmit a Namf_Communication_N1N2MessageTransfer message to the AMF. The Namf_Communication_N1N2MessageTransfer message may include a PDU Session Establishment Accept message to be transmitted by the SMF to UE-1 and N2 SM information to be transmitted to the NG-RAN.

9) The AMF may transmit an N2 PDU session request message to the NG-RAN. The N2 PDU session request message may include N2 SM information (N2 SM information to be transmitted to NG-RAN) received from the SMF and a PDU session establishment accept message (PDU session establishment accept message to be transmitted to UE-1).

10) NG-RAN may transmit a PDU session establishment accept message to UE-1. In addition, the NG-RAN may perform a procedure of setting up a necessary radio resource in relation to the generated (or established) PDU session. In order for the NG-RAN to transmit a PDU session establishment accept message to UE-1 and/or to perform a procedure for setting radio resources, an RRC reconfiguration message may be used.

11) UE-1 may transmit a response (eg, a Direct Communication Accept message) to the unicast link setup requested from UE-2 in step 2) to UE-2. The direct communication accept message may include information indicating that a PDU session has been generated (or established). The direct communication accept message may include 3GPP PS data off support indication information. 3GPP PS data off support indication information may be, for example, information indicating whether the PS Data Off function of UE-2 can be supported by the relay operation of UE and the network. For example, the 3GPP PS data off support indication information may be based on the 3GPP PS data off support indication information included in the PDU session establishment accept message received by UE-1 in step 10). The 3GPP PS data off support indication information included in the PDU session establishment accept message may be information that the SMF includes in the PDU session establishment accept message. When PS Data Off status information is included in the PDU Session Establishment Request message transmitted by the UE, the SMF may include 3GPP PS data off Support indication information in the PDU session establishment accept message, in order to inform whether the PDU Session (DNN).

After step 2) is performed, after UE-1 may directly transmit a response message indicating that the unicast link setup request has been successfully received, the UE-1 may transmit a direct communication accept message to the UE-2, a communication accept message according to step 11) after the PDU session is generated.

Alternatively, UE-1 may directly transmit a communication accept message to UE-2 immediately after step 2). Thereafter, UE-1 may transmit a message indicating that the PDU session has been generated (or established) to UE-2 in step 11).

Alternatively, UE-1 may directly transmit a communication accept message to UE-2 immediately after step 2). As UE-2 receives the direct communication accept message, UE-2 may transmit uplink data to UE-1. In this case, if it is before the PDU session for UE-2 is generated (or established), UE-1 stores the uplink data transmitted by UE-2, and after the PDU session is generated, the UE-1 may transmit the uplink data to NG-RAN and/or a network node (eg, SMF, AMF, UPF, etc.).

As a PDU session for UE-2 is established (or generated), UE-1 may store a context (eg, a context of UE-2). The context (eg, the context of UE-2) may include all information necessary for UE-1 to provide a network connection service to UE-2 using a PDU session for UE-2. For example, UE-1 may store a context (eg, a context of UE-2) including PS Data Off status information of UE-2.

For reference, the operation after step 12) may be an operation performed when a change to the PS Data Off status of UE-2 occurs. Therefore, when the change to the PS Data Off status of UE-2 does not occur, the operation after step 12) may not be performed.

12) A change may occur in the PS Data Off status of UE-2. For example, the PS Data Off status of UE-2 may be changed from deactivated to activated or changed from activated to deactivated. A change may occur in PS Data Off status of UE-2 according to a user's input. In order to reflect the change in PS Data Off status of UE-2, UE-2 may transmit a PC5 message requesting (or notifying) change of PS Data Off status to UE-1. The PC5 message transmitted by UE-2 to request a PS Data Off status change may be a message used by changing or extending an existing PC5-S message (eg, a Link Modification Request message), or may be a new PC5-S message that is defined and used (eg, PS Data Off status update message).

The PC5 message requesting (or notifying) the PS Data Off status change transmitted by UE-2 may include "v) PS Data Off status information" among the information of i) to v) described in step 2). In addition, the PC5 message requesting (or notifying) PS Data Off status change may further include one or more of the information of i) to iv) described in step 2).

13) UE-1 may initiate a procedure for notifying the network of a change in PS Data Off status of UE-2 based on the PC5 message requesting (or notifying) the PS Data Off status change received from UE-2. For example, UE-1 may transmit a PDU Session Modification Request message to the AMF. UE-1 may notify the network of a change in PS Data Off status of UE-2 to the AMF by transmitting a PDU session modification request message. For a detailed operation of the PDU session modification procedure initiated when the PDU session modification request message is transmitted, refer to the examples of FIGS. 7a and 7b. Hereinafter, an operation performed after the PDU session modification request message is transmitted will be described focusing on the contents proposed in the disclosure of the present specification, which may be applied throughout the disclosure of the present specification.

The UE may transmit the PDU session modification request message to the AMF by including the information a) and b) described in step 3) in the PDU session modification request message.

14) The AMF may transmit a PDU session modification request message to the SMF. For example, the AMF may transmit an Nsmf_PDUSession_UpdateSMContext Request message including a PDU session modification request message to the SMF.

15) SMF may perform SM Policy Association Modification procedures with PCF.

While the SM Policy Association Modification procedure is being performed, the SMF may provide the PCF with identifier information of UE-2, which is a remote UE, and PS Data Off status information of UE-2, based on the PDU session modification request message received in step 14). The PCF may generate or configure (or set) PCC rules for UE-2, which is a Remote UE, based on PS Data Off status information of UE-2.

For example, when the PS Data Off status of UE-2 is changed from activated to deactivated, the PCF may generate or configure (or set) PCC rules for UE-2, in order to enable all the services and/or traffic using PDU session related to the UE-2 to be transmitted and received between the UE-2 and the network. When the PS Data Off status of UE-2 is changed from deactivated to activated, the PCF may generate or configure (or set) PCC rules for UE-2, in order to enable the services and/or traffic related to the PS Data Off exempt service to be transmitted and received between the UE-2 and the network.

16) The SMF may transmit a response message to the AMF. For example, the SMF may transmit the Nsmf_PDUSession_CreateSMContext Response message as a response message to the AMF. The response message transmitted by the SMF may include a PDU Session Modification Command message to be transmitted to UE-1. In addition, the response message transmitted by the SMF may also include N2 SM information to be transmitted to the NG-RAN.

17) The AMF may transmit an N2 PDU session request message to the NG-RAN. The N2 PDU session request message may include a PDU session modification command message to be transmitted to UE-1 received from the SMF. In addition, when the SMF transmits a response message including N2 SM information to the AMF, the N2 PDU session request message may include N2 SM information.

18) NG-RAN may transmit a PDU session modification command message to UE-1. In addition, the NG-RAN may perform a procedure of setting up a necessary radio resource in relation to the modified PDU session. In order for the NG-RAN to transmit a PDU session modification command message to UE-1 and/or to perform a procedure for setting radio resources, an RRC reconfiguration message may be used.

19) UE-1 may transmit a response message (eg, a PC5 message including this response message) to the PC5 message requesting (or notifying) the PS Data Off status change received in step 12) to UE-2. This response message may include information indicating that the PDU session has been changed (or modified). In addition, this response message may include information indicating that the change of PS Data Off status has been processed. In addition, this response message may include 3GPP PS data off support indication information. 3GPP PS data off support indication information may be based on the 3GPP PS data off support indication information included in the PDU session modification command message received by UE-1 in step 18). The 3GPP PS data off support indication information included in the PDU session modification command message may be information that the SMF includes in the PDU session modification command message. When PS Data Off status information is included in the PDU Session Modification Request message sent by the UE, the SMF may include 3GPP PS data off support indication information may in the PDU session modification command message, in order to inform whether PS Data OFF of the corresponding PDU Session (DNN) is supported.

After step 12) is performed, UE-1 directly transmits a response message indicating that the PS Data Off status change request has been successfully received to UE-2, and after the PDU session is modified (or changed), the UE-1 may transmit the response message (or a PC5 message including a response message) according to step 19) to UE-2.

Alternatively, UE-1 may transmit a PC5 message to UE-2 immediately after step 12). Thereafter, UE-1 may transmit a message indicating that the PDU session has been modified (or changed) in step 19).

UE-1 may update and store PS Data Off status information of UE-2. For example, UE-1 may update and store PS Data Off status information of UE-2 based on "v) PS Data Off status information" received from UE-2 in step 12).

20 to 23) Steps 20) to 23) may be performed in the same manner as steps 9) to 12a) of the example described with reference to FIGS. 7a and 7b.

For reference, when UE-2 activates PS Data Off in FIGS. 11a and 11b (ie, when the PS Data Off status of UE-2 is "activated"), PS Data Off exempt service may exist for a connection (eg, PC5 link and/or PDU session) for which UE-2 requested a network connection service from UE-1. In this case, UE-2 may transmit only traffic related to the PS Data Off exempt service (eg, uplink traffic corresponding to the PS Data Off exempt service) to the network through UE-1. Also, the network may transmit only traffic related to the PS Data Off exempt service (eg, downlink traffic corresponding to the PS Data Off exempt service) to the UE-2 through the UE-1. When UE-2 activates PS Data Off, the description of traffic transmitted by UE-2 and traffic transmitted by the network to UE-2 may be generally equally applied to the disclosure of the present specification.

2. Second Example of the Disclosure of the Present Specification

A second example of the disclosure of the present specification will be described with reference to FIG. 12.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
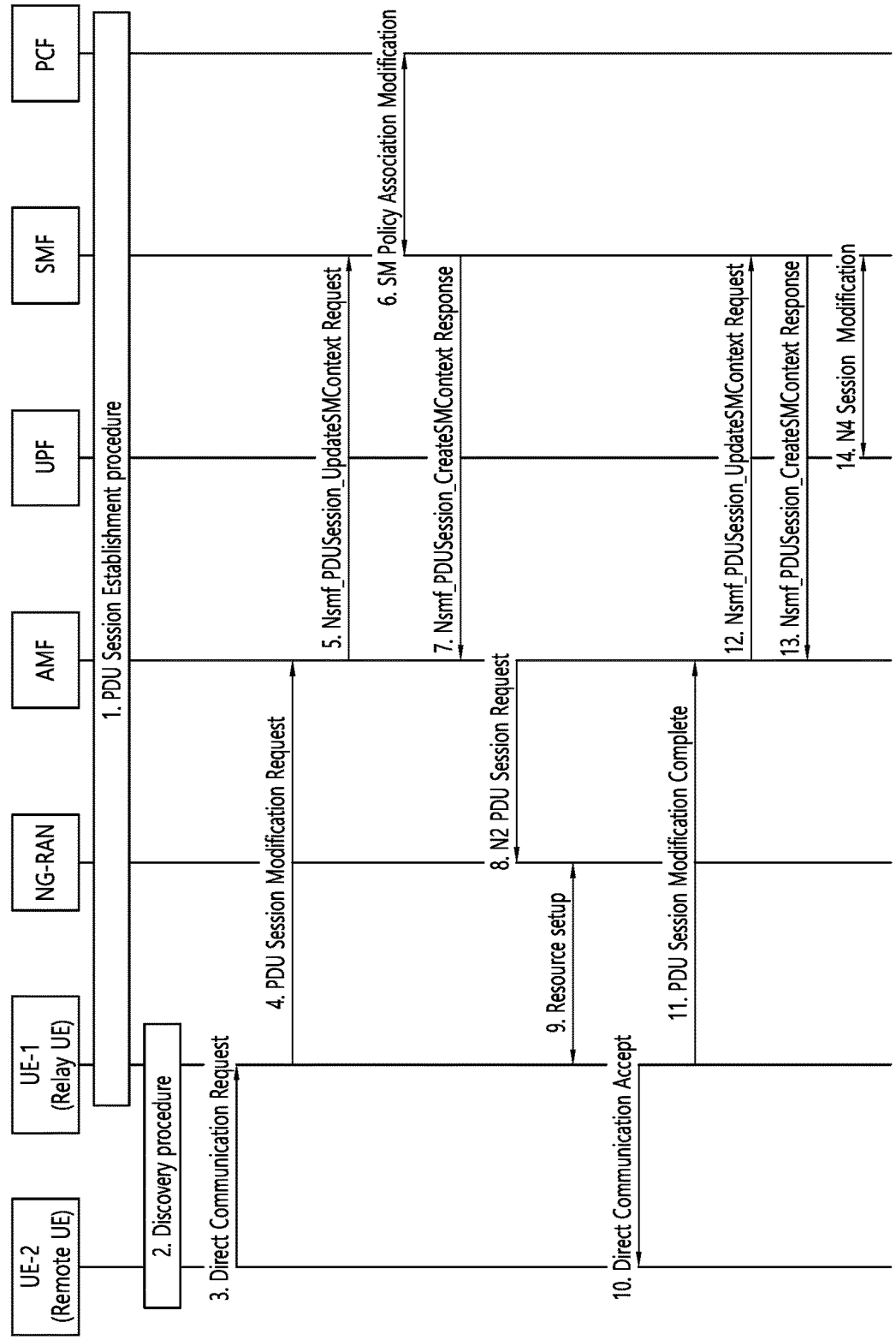
FIG. 12 shows an example of a signal flow diagram according to a second example of the disclosure of the present specification.

FIG. 12 shows an example of a signal flow diagram according to a second example of the disclosure of the present specification.

Refer to FIG. 12, UE-2 (Remote UE), UE-1 (Relay UE), NG-RAN (eg, gNB, ng-eNB, etc.), AMF, UPF, SMF, and PCF are illustrated.

In the example of FIG. 12, it is assumed that UE-1 (Relay UE) has performed a registration procedure (eg, FIGS. 5a and 5b) for 5GS.

1) UE-1 that has performed a registration procedure (eg, FIGS. 6a and 6b) for 5GS may generate (or establish) a PDU session for a specific DNN. For example, UE-1 may perform a PDU session establishment procedure to generate (or establish) a PDU session for a specific DNN.

2) UE-2 (Remote UE) may perform a discovery procedure. For example, UE-2 may perform a discovery procedure for discovering a UE-to-Network Relay in order to receive a network connection service. UE-2 may perform a discovery procedure and may select UE-1 as a UE-to-Network Relay. The discovery procedure performed in step 2) may be performed in the same manner as the discovery procedure described in step 1) of FIGS. 11b and 11b.

3) UE-2 may transmit a direct communication request message to UE-1. For example, UE-2 may transmit a request message (eg, Direct Communication Request message) for unicast link setup to UE-1 in order to receive a network connection service from UE-1. The operation performed in step 3) may be performed in the same manner as the operation described in step 2) of FIGS. 11a and 11b. For example, UE-2 may include the same information as in the example described in step 2) of FIGS. 11a and 11b (eg, information of i) to v) in the direct communication request message.

4) Based on the direct communication request message received from UE-2, UE-1 may determined to change (or modify or update) the existing PDU session (PDU session generated (or established) by the UE-1 in step 1)), for the DNN to which UE-2 wants to receive network connection service. According to this determination, UE-1 may transmit a PDU session establishment request message to the AMF.

The reason UE-1 decides to change (or modify or update) the existing PDU session is because there is a PDU session (PDU session generated (or established) by the UE-1 in step 1)) corresponding to the same DNN as the DNN for which UE-2 wants to receive the network connection service exists. For a detailed operation of the PDU session modification procedure initiated when the PDU session modification request message is transmitted, refer to the examples of FIGS. 7a and 7b. Hereinafter, an operation performed after the PDU session modification request message is transmitted will be described focusing on the contents proposed in the disclosure of the present specification, which may be applied throughout the disclosure of the present specification.

The PDU session modification request message transmitted by UE-1 may include information such as the following examples (eg. a) and b)):

a) Identifier information indicating the Remote UE: The identifier information indicating the Remote UE may be based on information received from UE-2 in step 3). In addition, the identifier information indicating the Remote UE may include IP address information used by the Remote UE (eg, UE-2) to receive a network connection service from the UE-to-Network Relay (eg, UE-1).

b) PS Data Off status information of Remote UE: PS Data Off status information of the Remote UE may be based on information received from UE-2 in step 3).

UE-1 may transmit a PDU session modification request message including a) and b) to the AMF.

Detailed descriptions of a) and b) may be applied in the same manner as a) and b) described in step 3) of FIGS. 11a and 11b. For example, a) and b) may be connected to each other as described in step 3) of FIGS. 11a and 11b. In the description of steps a) and b) in steps 3) of FIGS. 11a and 11b, the description about the PDU session establishment request message is replaced with the PDU session modification request message of FIG. 12 and can be applied to step 4) of FIG. 12. In addition, as described in step 3) of FIGS. 11a and 11b, UE-1 may check with the network whether UE-1 is capable of providing a network connection service to UE-2 and/or whether UE-2 is capable of being provided with the network connection service from UE-1, based on a) and/or b).

5) The AMF may transmit a PDU session modification request message to the SMF. For example, the AMF may transmit an Nsmf_PDUSession_CreateSMContext Request message including a PDU session modification request message to the SMF. In the same manner as described in step 4) of FIGS. 11a and 11b, the SMF may perform procedure for checking whether UE-1 is capable of providing a network connection service to UE-2 and/or whether UE-2 is capable of being provided with a network connection service from UE-1. For detailed description of a procedure for checking whether UE-1 can provide a network connection service to UE-2 and/or whether UE-2 can receive a network connection service from UE-1 is shown in FIGS. 11a and 11b, the contents described in step 4) of FIGS. 11a and 11b apply mutatis mutandis.

6) SMF may perform SM Policy Association Establishment procedures with PCF.

While the SM Policy Association Establishment procedure is being performed, the SMF may provide the PCF with identifier information of UE-2, which is a Remote UE, and PS Data Off status information of UE-2, based on the PDU session modification request message received in step 5). The PCF may generate or configure (or set) PCC rules for UE-2, which is a Remote UE, based on PS Data Off status information of UE-2.

For example, if the PS Data Off status of UE-2 is deactivated, the PCF may create or configure (or set) PCC rules for the UE-2, in order to enable all services and/or traffic using the PDU session related to UE-2 be transmitted and received UE-2 and the network. When the PS Data Off status of UE-2 is activated, the PCF may generate or configure (or set) PCC rules for UE-2, in order to enable the services and/or traffic related to the PS Data Off exempt service among the services and/or traffic using the PDU session related to UE-2 to be transmitted and received between network and UE-2.

For reference, these PCC rules for UE-2 may not affect PCC rules for UE-1. For example, although UE-1 and UE-2 share and use a PDU session, the PS Data Off Status of UE-2 may not affect the PS Data Off status of UE-1 and the PCC rules of UE-1. Even when the PDU session used by UE-2 is shared and used by another Remote UE (a Remote UE other than UE-2) connected to UE-1, the PCC rules and/or PS Data Off status of UE-2 may not affect the PS Data Off status of other Remote UEs and the PCC rules of UE-1. This may mean that PCC rules are independently generated or configured (or set) according to the PS Data Off status of each UE, and PS Data Off is independently applied to each UE based on this.

7) The SMF may transmit a response message to the AMF. For example, the SMF may transmit the Nsmf_PDUSession_CreateSMContext Response message as a response message to the AMF. The response message transmitted by the SMF may include a PDU Session Modification Command message to be transmitted to UE-1. In addition, the response message transmitted by the SMF may also include N2 SM information to be transmitted to the NG-RAN.

8) The AMF may transmit an N2 PDU session request message to the NG-RAN. The N2 PDU session request message may include a PDU session modification command message to be transmitted to UE-1 received from the SMF. In addition, when the SMF transmits a response message including N2 SM information to the AMF, the N2 PDU session request message may include N2 SM information.

9) NG-RAN may transmit a PDU session modification command message to UE-1. In addition, the NG-RAN may perform a procedure of setting up a necessary radio resource in relation to the modified PDU session. In order for the NG-RAN to transmit a PDU session modification command message to UE-1 and/or to perform a procedure for setting radio resources, an RRC reconfiguration message may be used.

10) UE-1 may transmit a response (eg, a Direct Communication Accept message) to the unicast link setup requested from UE-2 in step 3) to UE-2. The direct communication accept message may include information indicating that a PDU session has been generated (or established). The direct communication accept message may include 3GPP PS data off support indication information. The direct communication accept message may include 3GPP PS data off support indication information. 3GPP PS data off support indication information may be, for example, information indicating whether the PS Data Off function of UE-2 can be supported by the relay operation of UE-1 and the network. For example, the 3GPP PS data off support indication information may be based on the 3GPP PS data off support indication information included in the PDU session modification command message received by UE-1 in step 9). The 3GPP PS data off support indication information included in the PDU session modification command message may be information that the SMF includes in the PDU session modification command message. When PS Data Off status information is included in the PDU Session Modification Request message transmitted by the UE, the SMF may include 3GPP PS data off support indication information in the PDU session modification command message to inform whether the corresponding PDU Session (DNN) supports PS Data OFF.

11 to 14) Steps 11) to 14) may be performed in the same manner as steps 20) to 23) of FIGS. 11a and 11b.

For reference, when UE-2 activates PS Data Off in FIG. 12 (ie, when PS Data Off status of UE-2 is "activated"), PS Data Off exempt service may exist for a connection (eg, PC5 link and/or PDU session) for which the UE-2 requested a network connection service from UE-1. In this case, UE-2 may transmit only traffic related to the PS Data Off exempt service (eg, uplink traffic corresponding to the PS Data Off exempt service) to the network through UE-1. Also, the network may transmit only traffic related to the PS Data Off exempt service (eg, downlink traffic corresponding to the PS Data Off exempt service) to the UE-2 through the UE-1. When UE-2 activates PS Data Off, the description of the traffic transmitted by the UE-2 and the traffic transmitted by the network to the UE-2 may be generally equally applied to the disclosure of the present specification. In FIG. 12, when PS Data Off status of UE-2 is activated and PS Data Off status of UE-2 is deactivated, the network may transmit all downlink traffic directed to UE-1 to UE-1. That is, PS Data Off between UEs sharing a PDU session may be independently applied to each UE based on the PS Data Off status of each UE.

3. Third Example of the Disclosure of the Present Specification

A third example of the disclosure of the present specification will be described with reference to FIG. 13.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
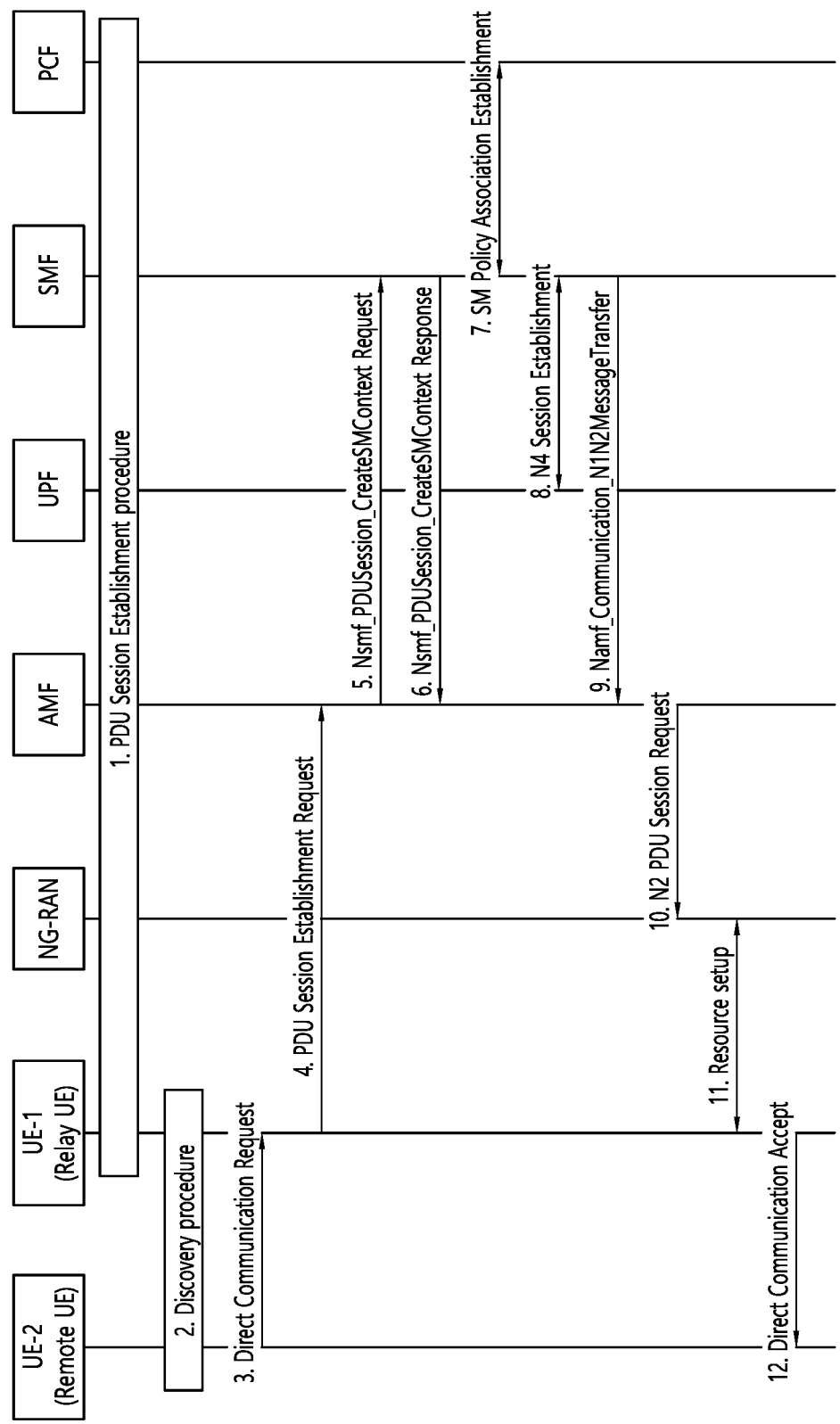
FIG. 13 shows an example of a signal flow diagram according to a third example of the disclosure of the present specification.

FIG. 13 shows an example of a signal flow diagram according to a third example of the disclosure of the present specification.

Referring to FIG. 13, UE-2 (Remote UE), UE-1 (Relay UE), NG-RAN (eg, gNB, ng-eNB, etc.), AMF, UPF, SMF, and PCF are shown.

In the example of FIG. 13, it is assumed that UE-1 (Relay UE) has performed a registration procedure (eg, FIGS. 5a and 5b) for 5GS.

1 to 2) Steps 1) and 2) may be performed in the same manner as steps 1) and 1) described with reference to FIG. 12.

3) UE-2 may transmit a direct communication request message to UE-1. For example, UE-2 may transmit a request message (eg, Direct Communication Request message) for unicast link setup to UE-1 in order to receive a network connection service from UE-1. The operation performed in step 3) may be performed in the same manner as the operation described in step 2) of FIGS. 11a and 11b. For example, UE-2 may include the same information as in the example described in step 2) of FIGS. 11a and 11b (eg, information of i) to v)) in the direct communication request message.

Additionally, the direct communication request message in FIG. 13 may include information indicating that UE-2 supports the PS Data Off function. For example, UE-2 may transmit the direct communication request message to UE-1 by including information indicating that UE-2 supports the PS Data Off function in the direct communication request message.

4) UE-1 may transmit a PDU Session Establishment Request message to the AMF. For example, UE-1 may determine to generate (or establish) a new PDU session for the DNN to which UE-2 wants to be provided with a network connection service, based on the direct reception request message received from UE-2. Based on this determination, UE-1 may transmit a PDU session establishment request message to the AMF.

The reason that the UE-1 determines to generate (or establish) a new PDU session may be based on PS Data Off related information included in the direct communication message received in step 3). Here, the PS Data Off-related information received by UE-1 may mean "v) PS Data Off status information" described in step 2) of FIGS. 11a and 11b and/or "Information indicating that the UE-2 supports PS Data Off function" additionally described in step 3). For example, even if a PDU session corresponding to the DNN for which UE-2 requests the network connection service already exists (eg, the DNN of the PDU session established by the UE-1 in step 1) is same as the DNN for which UE-2 requested network connection service), UE-1 may determine to generate a separate PDU session for UE-2, regardless of an already existing PDU session.

A specific example in which UE-1 determines to generate (or establish) a new PDU session will be described.

For example, there is a PDU session generated (or established) by UE-1 for the DNN (eg, DNN for which UE-2 requests a network connection service), but if status of PS Data Off of UE-1 for this PDU session and the status of PS Data Off provided by UE-2 are different (eg, one of them is activated and the other is deactivated), UE-1 may determine to generate (or establish) a new PDU session for the DNN (eg, a DNN for which UE-2 requests a network connection service) for UE-2, which is a remote UE. In this example, the reason UE-1 determines to generate (or establish) a new PDU session is to solve a problem situation that may occur (eg, a problem situation due to complexity), when the network provides services for UE-to-Network Relay (eg UE-1) and Remote UE (eg UE-2) through one PDU session, although the PS Data Off status of the UE-to-Network Relay (eg, UE-1) is different from PS Data Off status of a Remote UE (eg, UE-2). An example of this problem situation (eg a problem situation due to complexity) is as the following.

For example, the PS Data Off status of the UE(s) using or sharing a PDU session that already exists for the DNN (eg, a DNN for which UE-2 requests a network connection service) may be deactivated, and the UE-2's PS Data Off status may be activated. In this case, when UE-2 shares an existing PDU session with another UE(s) (eg, UE-1), the PCF may generate (or configure or set) PCC rules to which PS Data Off is applied for UE-2 for the same PDU session, the PCF may generate (or configure or set) PCC rules to which PS Data Off is not applied for the remaining UEs. And, the PCF may provide these PCC rules to the SMF, and the SMF may provide it to the UPF. That is, among the services and/or traffic using the PDU session, for UE-2, the PCC rules may be generated (or configured or set), so that only the service and/or traffic related to the PS Data Off exempt service of UE-2 can be transmitted and received between the UE-2 and the network. On the other hand, PCC rules may be generated (or configured or set) so that all services and/or traffic of UEs other than UE-2 among the UEs sharing the PDU session may be transmitted and received between the UEs and the network. Therefore, a high-complexity problem situation may occur in this case, in which, for one PDU session, for a specific UE, PCC rules are generated (or configured or set) so that only services and/or traffic related to the PS Data Off exempt service can be transmitted/received between the UE and the network, for other UEs, PCC rules are generated (or configured or set) so that all services and/or traffic are transmitted and received between the UEs and the network.

In order to solve this problem, when the status of PS Data Off of UE-1 and the status of PS Data Off provided by UE-2 are different, UE-1 may determine to generate (or establish) a new PDU session for UE-2, which is a remote UE, for the DNN.

For a specific DNN, the same PDU session may be used or shared between UEs having the same PS Data Off status (Relay UE and/or Remote UE(s)). In this case, for the PDU session in which the PS Data Off status is deactivated, the PCF may generate (configure or set) PCC rules so that all services/traffic are transmitted and received between the UE and the network using the corresponding PDU session regardless of the UE using the PDU session.

As in the example described above, when the status of PS Data Off of UE-1 and the status of PS Data Off provided by UE-2 are different, UE-1 may determine to generate (or establish) a new PDU session for a DNN (eg. DNN for which the UE-2 request network connection service) for UE-2 which is Remote UE. In this case, UE-1 may generate (or establish) a new PDU session for the DNN for UE-2. As UE-1 generates (or establishes) a new PDU session for the DNN for UE-2, UE-1 may have a PDU session in which PS Data Off status is activated and a PDU in which PS Data status is deactivated for the same DNN.

A plurality of Remote UEs with PS Data Off status, which is activated, may exist for the same DNN. In this case, UE-1 may generate a separate PDU session for each of a plurality of Remote UEs whose PS Data Off status is activated for the same DNN. Alternatively, in this case, UE-1 may allow a plurality of Remote UEs to share and use a PDU session in which PS Data Off status is activated for the same DNN. For example, if UE-1 already has a PDU session in which PS Data Off status is activated for the same DNN, UE-1 may allow a plurality of Remote UEs to share and use this PDU session. Alternatively, UE-1 may generate (or establish) a PDU session in which PS Data Off status is activated for the same DNN, so that a plurality of Remote UEs share and use this PDU session.

When the PS Data Off status of the Remote UE (eg UE-2) is changed, the Relay UE (eg UE-1) may enables the Remote UE (eg UE-2) to use a PDU session corresponding to the changed PS Data Off status. For example, UE-1 having a PDU session with PS Data Off status which is deactivated may generate (or establish) a PDU session with PS Data Off status which is activated for UE-2 with PS Data Off status which is activated. Afterwards, when the PS Data Off status of UE-2 is changed to Deactivated, UE-1 may allow UE-2 to use the existing PDU session (the PDU session that UE-1 had and in which the PS Data Off status is deactivated).

For reference, detailed operations for transmitting the PDU session establishment request message and performing the PDU session establishment procedure refer to the description of step 3) of FIGS. 11a and 11b.

5 to 12) Steps 5) to 12) may be performed in the same manner as steps 4) to 11) of FIGS. 11a and 11b.

4. Fourth Example of the Disclosure of the Present Specification

Figure 14:
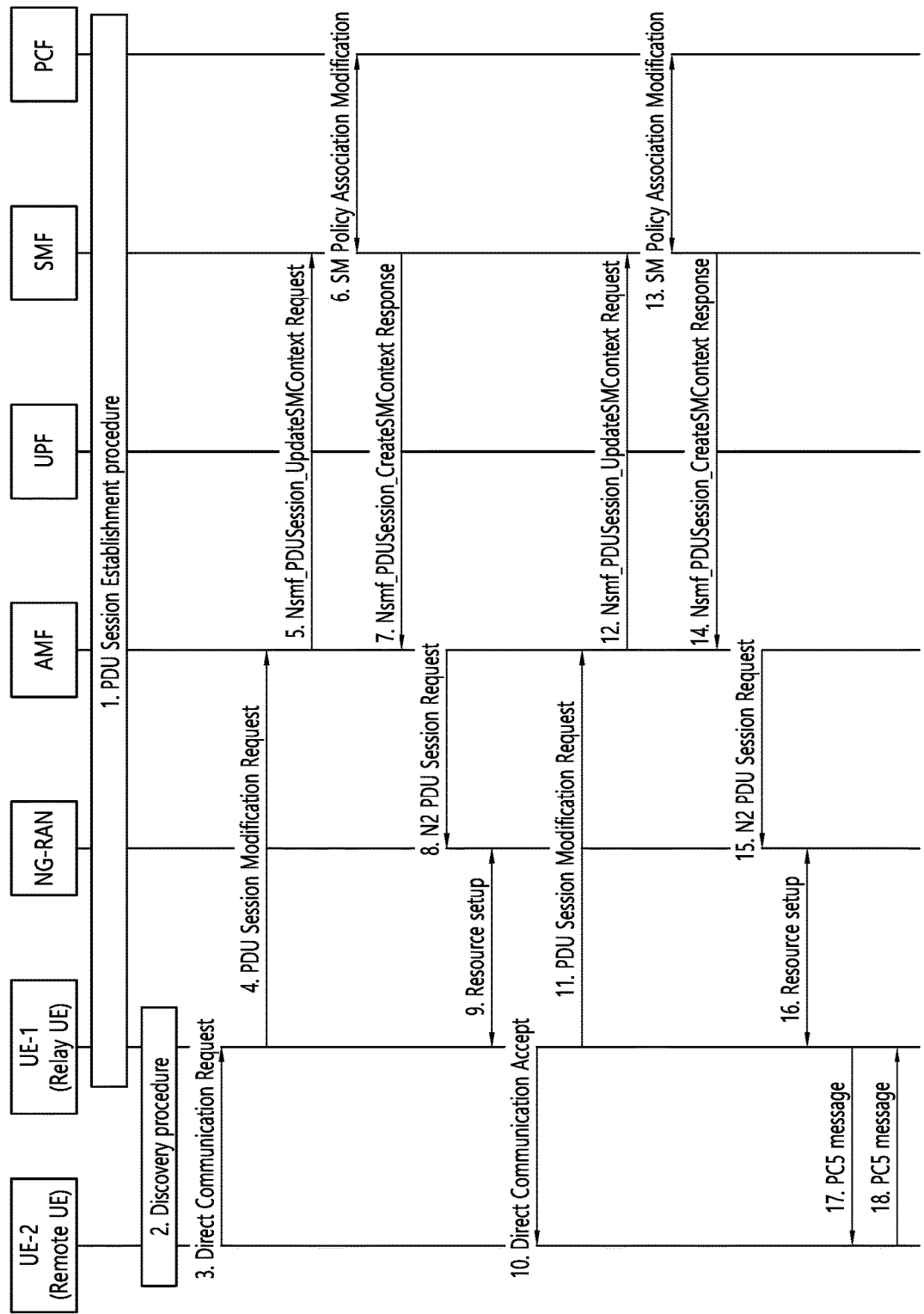
FIG. 14 shows an example of a signal flow diagram according to a fourth example of the disclosure of the present specification.

With reference to FIG. 14, a fourth example of the disclosure of the present specification will be described. In the first to third examples of the disclosure of the present specification described with reference to FIGS. 11a and 11b to 13, when the Remote UE provides PS Data Off status information to the Relay UE, the Relay UE may reflect the PS Data Off status information of the Remote UE in the PDU session. Accordingly, PS Data Off status for each Relay UE and Remote UE(s) was applied according to the PS Data Off Status of each UE. In a fourth example of the disclosure described with reference to the example of FIG. 14, a method in which the PS Data Off status of the Relay UE is equally applied to the Remote UE will be described.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 14 shows an example of a signal flow diagram according to a fourth example of the disclosure of the present specification.

Referring to FIG. 14, UE-2 (Remote UE), UE-1 (Relay UE), NG-RAN (eg, gNB, ng-eNB, etc.), AMF, UPF, SMF, and PCF are shown.

In the example of FIG. 14, it is assumed that UE-1 (Relay UE) has performed a registration procedure (eg, FIGS. 5a and 5b) for 5GS.

1) Step 1) may be performed in the same manner as step 1) of FIG. 12.

2) UE-2 (Remote UE) may perform a discovery procedure. For example, UE-2 may perform a discovery procedure to discover a UE-to-Network Relay in order to receive a network connection service. UE-2 may perform a discovery procedure and may select UE-1 as a UE-to-Network Relay. Step 2) may be performed in the same manner as step 2) of FIG. 12, and the following may be additionally applied.

Additionally, while performing a discovery procedure, UE-1 may provide one or more of the following information to another UE (eg, a Remote UE such as UE-2):

2-a) PS Data Off status information of UE-1

2-b) Information indicating that PS Data Off status of Relay UE is applied or reflected to Remote UE In other words, UE-1 may transmit one or more information of 2-a) and/or 2-b) to another UE (eg, a Remote UE such as UE-2) while performing the discovery procedure in step 2).

When UE-2 performs a discovery procedure and selects a UE-to-Network Relay, if the PS Data Off status of the UE-to-Network Relay is the same as the PS Data Off status of UE-2, the UE-2 may select the corresponding UE-to-Network Relay by giving higher priority to the corresponding UE-to-Network Relay than other UE-to-Network Relays having different PS Data Off status. Accordingly, UE-2 may select a UE-to-Network Relay having the same PS Data Off status as its PS Data Off status and request a network connection service from the selected UE-to-Network Relay. As UE-2 requests a network connection service from the UE-to-Network Relay having the same PS Data Off status, a problem situation (eg, problem situation due to one PDU session being shared by UEs with different PS Data Off status) can be solved.

In other words, in FIG. 14, UE-2 performs a discovery procedure, such that the UE-2 may discover a UE-to-Network Relay (eg, UE-1) having the same PS Data Off status as its own (UE-2) PS Data Off status and select it as a UE-to-Network Relay.

3) UE-2 may transmit a direct communication request message to UE-1. For example, UE-2 may transmit a request message (eg, Direct Communication Request message) for unicast link setup to UE-1 in order to receive a network connection service from UE-1. The operation performed in step 3) may be performed in the same manner as the operation described in step 2) of FIGS. 11a and 11b. For example, UE-2 may include the same information as in the example described in step 2) of FIGS. 11a and 11b (eg, information of i) to v)) in the direct communication request message.

However, unlike step 2) of FIGS. 11a and 11b, the direct communication request message of step 3) of FIG. 14 may not include "v) PS Data Off status information". Because, in step 2), UE-2 performed a discovery procedure to discover a UE-to-Network Relay (eg, UE-1) having the same PS Data Off status as its own (UE-2) PS Data Off status and selected the UE-to-Network Relay (eg, UE-1) having the same PS Data Off status as the UE-to-Network Relay.

4 to 9) Steps 4) to 9) may be performed in the same manner as Steps 4) to 9) of FIG. 12, and the same differences as in the example below may be applied to the example of FIG. 14.

For example, unlike step 4) of the example of FIG. 12, "b) PS Data Off status information of the Remote UE" in step 4) may not be included in the PDU session modification request message transmitted by UE-1. In the operations in step 4) and after step 4), it is assumed that the operations related to "b) PS Data Off status information of the Remote UE" described in the example of FIG. 12 are not performed. For example, in step 6), when the PCF generates or configures (or sets) PCC rules for UE-2 through the SM Policy Association Establishment procedure, the PCF may generate or configure (or set) PCC rules for UE-2 by applying the PS Data Off status of UE-1, which is a relay UE. For reference, the PS Data Off status of UE-1 may be provided by UE-1 to the network when step 1) is performed. In step 1) and/or step 4), UE-1 may provide the network with information (eg, information requesting to apply PS Data Off of Relay UE when the PCF generate or configure (or set) PCC rules for UE-2, by applying this information to the PCF) that the network requests to apply the PS Data Off status of the Relay UE (ie, UE-1 itself) to the Remote UE.

According to the above example, the PCF may generate or configure (or set) PCC rules for UE-2 by applying the PS Data Off status of UE-1, which is a relay UE. For example, if UE-1 has a PDU session with PS Data Off status deactivated, the PCF configures (or set) PCC rules for UE-2, in order to enable all services/traffic using the PDU session between UE-2 and the network to be transmitted and received between the UE-2 and the network. For another example, when PS Data Off status of UE-1 is activated, the PCF may generate or configure (or set) PCC rules for UE-2, in order to enable services and/or traffic related to PS Data Off exempt service among services and/or traffic using the corresponding PDU session to be transmitted and received between UE-2 and the network 10) UE-1 may transmit to UE-2 a response (eg, a Direct Communication Accept message) to the unicast link setup requested from UE-2 in step 3). The direct communication accept message may include information indicating that a PDU session has been generated (or established). The direct communication acceptance message may include PS Data Off status information of UE-1.

For reference, the operations after step 11) below may be operations performed when a change to the PS Data Off status of UE-2 occurs. Therefore, when the change to the PS Data Off status of UE-2 does not occur, the operation after step 11) may not be performed.

11) A change may occur in the PS Data Off status of UE-1. For example, the PS Data Off status of UE-1 may be changed from deactivated to activated, or from activated to deactivated. A change may occur in PS Data Off status of UE-1 according to a user's input. In order to reflect the change in PS Data Off status of UE-1, UE-1 may initiate a PDU session establishment procedure. For example, UE-1 may transmit a PDU session establishment request message to the AMF in order to reflect the change of PS Data Off status.

UE-1 may provide information requesting that the network apply the PS Data Off status of the Relay UE (ie, UE-1 itself) to the Remote UE. For example, UE-1 may include information requesting the network to apply the PS Data Off status of the Relay UE (ie, UE-1 itself) to the Remote UE in the PDU session establishment request message. In addition, UE-1 may include identifier information indicating the Remote UE in the PDU session establishment request message and provide it to the network.

12 to 16) Steps 12) to 16) refer to steps 9) to 12a) of the example described with reference to FIGS. 7a and 7b. All steps of the PDU session modification procedure are not shown in FIG. 14, and the following description will focus on the operation proposed in the fourth example of the disclosure of the present specification, which may be applied throughout the present specification.

In step 13), the PCF may generate or configure (or set) PCC rules for UE-1 and PCC rules for UE-2 based on the PS Data Off status information changed by UE-1.

17) UE-1 may transmit a PC5 message to UE-2 in order to provide the changed PS Data Off status information to UE-2. Here, the PC5 message transmitted by UE-1 may be a message used by changing or extending an existing PC5-S message (eg, a Link Modification Request message), or a message in which a new PC5-S message is defined and used (eg. PS Data Off status update message).

For reference, step 17) may be performed after step 11) is performed and before step 12) is performed.

18) UE-2 may transmit a PC5 message responding to UE-1 to UE-1.

For reference, when UE-1 activates PS Data Off in step 11) of FIG. 14 (ie, when the PS Data Off status of UE-1 is changed to "activated"), UE-2 may perform an operation related to PS Data Off, based on PS Data Off status information of UE-1 provided through step 17). For example, when the PS Data Off exempt service exists UE-2 may transmit only traffic related to the PS Data Off exempt service to the network through UE-1, based on that the PS Data Off status is "activated".

5. Fifth Example of the Disclosure of the Present Specification

Figure 15:
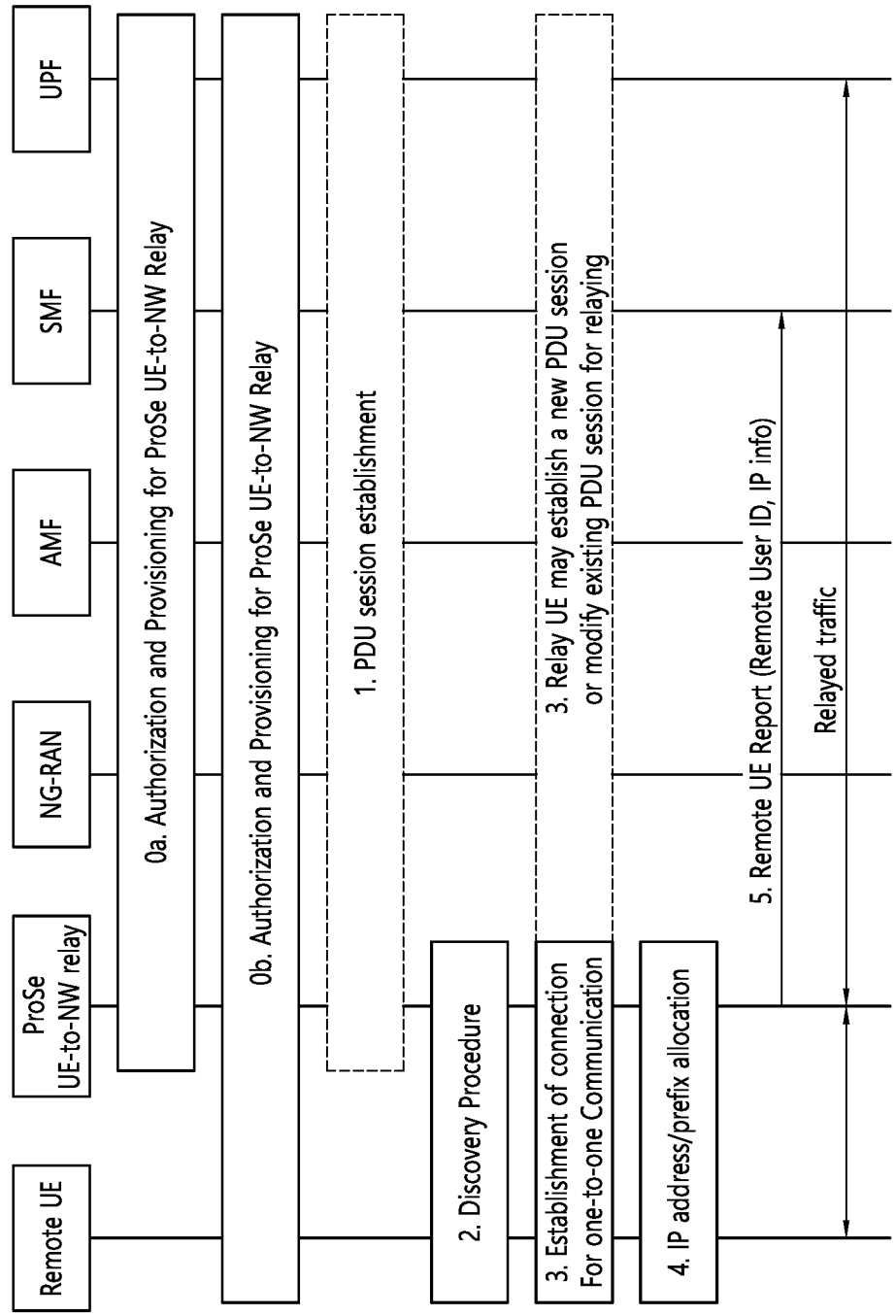
FIG. 15 shows an example of a signal flow diagram according to a fifth example of the disclosure of the present specification.

With reference to FIG. 15, a fifth example of the disclosure of the present specification will be described. The fifth example of the present specification may be, for example, an example to which the operations described in the first to fourth examples of the disclosure of the present specification are applied.

The following drawings were created to explain a specific example of the present specification. Since the names of specific devices described in the drawings or the names of specific signals/messages/fields are presented by way of example, the technical features of the present specification are not limited to the specific names used in the following drawings.

FIG. 15 shows an example of a signal flow diagram according to a fifth example of the disclosure of the present specification.

Refer to FIG. 15, the Remote UE, 5G ProSe UE-to-NW (Network) Relay (ie, Relay UE), NG-RAN, AMF, SMF and UPF are shown.

0) During the registration procedure, Authorization and provisioning for ProSe UE-to-NW relay and Remote UE may be performed.

1) The 5G ProSe UE-to-Network Relay may establish a PDU session for relaying data of the Remote UE, based on the default PDU session parameter received in step 0) or the default PDU session parameter preset in the UE-to-Network Relay. The default PDU session parameter may be, for example, S-NSSAI, DNN, Session and service continuity (SSC) mode, and the like. In case of IPv6, the ProSe UE-to-Network Relay may obtain an IPv6 prefix from the network through a prefix delegation function.

2) Based on the authorization and provisioning in step 0), the Remote UE may perform a discovery procedure for the 5G ProSe UE-to-Network Relay. The Remote UE may learn about a connectivity service provided by the 5G ProSe UE-to-Network Relay while performing a discovery procedure. For reference, the discovery procedure of step 2) may be performed in the same manner as the discovery procedure of step 1) of the example of FIGS. 11a and 11b or the discovery procedure of step 2) of FIGS. 12 to 14 described above.

3) The Remote UE may select a 5G ProSe UE-to-Network Relay and establish a connection for One-to-one ProSe Direct Communication. If there is no PDU session that satisfies the requirements of PC5 connection with the Remote UE (eg S-NSSAI, DNN, QoS, etc.), 5G ProSe UE-to-Network Relay may initiate a PDU session establishment procedure for establishing a new PDU session for relay or may initiate a PDU session modification procedure.

To perform step 3), the Remote UE may transmit a direct communication request message to the ProSe UE-to-NW Relay. For example, in order to establish a connection for one-to-one communication between the Remote UE and the ProSe UE-to-NW Relay, the Remote UE may transmit a direct communication request message to the ProSe UE-to-NW Relay. A detailed description of the direct communication request message transmitted by the Remote UE may be applied in the same manner as described in step 2) of the example of FIGS. 11a and 11b.

For reference, in step 3), the ProSe UE-to-NW Relay may determine whether to generate a new PDU session or modify a PDU session, as described in the first to fourth disclosures of the present specification described with reference to FIGS. 11a and 11b to 14. Accordingly, the ProSe UE-to-NW Relay may perform a PDU session establishment procedure or a PDU session modification procedure as described in the first to fourth disclosures of the present specification previously described with reference to FIGS. 11a and 11b to 14.

4) An IPv6 prefix or an IPv4 address for the Remote UE may be assigned. After step 4), uplink relay and downlink relay may be started.

5) The 5G ProSe UE-to-Network Relay may transmit a Remote UE Report message to the SMF for a PDU session related to the relay. The Remote UE Report message may basically include Remote User ID and IP information of the Remote UE. The Remote User ID may be the identity (which may be provided through user information) of the Remote UE user successfully connected in step 3). The SMF may store the Remote User ID and related IP information in the SM context of the 5G ProSe UE-to-Network Relay for the PDU session related to the relay.

For IP information, the following principles can be applied:

- In case of IPv4, the UE-to-network relay may report the Transmission Control Protocol/User Datagram Protocol (TCP/UDP) port range assigned to each Remote UE together with the Remote User ID.
- In case of IPv6, the UE-to-network relay may report the IPv6 prefix assigned to each Remote UE together with the Remote User ID.

The Remote UE Report message transmitted in step 5) may be an SM NAS message, and the Remote UE Report message may be delivered to the SMF through the AMF. The ProSe UE-to-NW Relay may include PS Data Off status information of the Remote UE in the Remote UE Report message. For reference, the ProSe UE-to-NW Relay may include the PS Data Off status information of the Remote UE in the Remote UE Report message only when the PS Data Off status of the Remote UE is activated (that is, when the PS Data is in Off state).

Although not shown in FIG. 15, upon receiving the Remote UE Report message including PS Data Off status information of the Remote UE in step 5), the SMF may transmit PS Data Off status information of the Remote UE to the PCF. In addition, the SMF may transmit PS Data Off status information of the Remote UE to the PCF together with identifier information indicating the Remote UE (or Remote User ID and/or IP address of the Remote UE) and/or information converted into identifier information indicating the Remote UE that can be recognized by the PCF. Then, the PCF may perform the operation described in step 6) of the example of FIGS. 11a and 11b. For example, the PCF may generate (or configure or set) PCC rules based on PS Data Off status information of the Remote UE. And, the PCF may provide the generated (or configured or set) PCC rules to the SMF. The operations of SMF, UPF, AMF, NG-RAN, ProSe UE-to-NW Relay, and Remote UE after the PCF provides PCC rules can be performed in the same way as the contents described in steps 6) to 11) described in the examples of FIGS. 11a and 11b.

After the ProSe UE-to-NW Relay generates or establishes a connection with the Remote UE, when the the ProSe UE-to-NW Relay performs step 5), the ProSe UE-to-NW Relay may provide PS Data Off status information of the Remote UE to the network using a separate message, instead of providing PS Data Off status information of the Remote UE to the network through the Remote UE Report message. For example, the ProSe UE-to-NW Relay may provide PS Data Off status information to the network by using an existing NAS message or a newly defined NAS message (eg, PS Data Off status update message or PS Data Off status transfer message).

Although not shown in FIG. 15, when the PS Data Off status of the Remote UE is changed, the Remote UE may notify the ProSe UE-to-NW Relay that the PS Data Off status of the Remote UE is changed. The operation of the Remote UE informing the ProSe UE-to-NW Relay that the PS Data Off status of the Remote UE has changed may be performed in the same manner as described in the first to fourth examples of the present disclosure. For example, the Remote UE may transmit a PC5 message requesting (or notifying) a PS Data Off status change to the ProSe UE-to-NW Relay in the same manner as in step 12) of the example of FIGS. 11a and 11b. When the ProSe UE-to-NW Relay receives the changed PS Data Off status information from the Remote UE, the ProSe UE-to-NW Relay may transmit a message informing that the PS Data Off status of the Remote UE is changed, to SMF serving the PDU session (eg, the PDU session corresponding to the network connection service in which the PS Data Off status of the Remote UE is changed) that provides the network connection service to the Remote UE. Here, for the message transmitted by the ProSe UE-to-NW Relay to the SMF, the same message as the message used in step 5) may be used, an existing NAS message may be used, or a newly defined NAS message may be used. The operation of the SMF, the operation of the PCF, the operation of the AMF, the operation of the NG-RAN, the operation of the ProSe UE-to-NW Relay, and the operation of the Remote UE that have received the changed PS Data Off information of the Remote UE may be performed in the same manner as described in the first to fourth examples of the disclosure of the present specification. For example, the operations described in steps 13) to 19) of the example of FIGS. 11a and 11b may be performed.

When the SMF receives a message including PS Data Off status information of the Remote UE from the ProSe UE-to-NW Relay, the SMF may transmit a response message to the message to the ProSe UE-to-NW Relay. The SMF may transmit this response message to the ProSe UE-to-NW Relay after processing the change of the PS Data Off status of the Remote UE, and the SMF may transmit this response message to the ProSe UE-to-NW Relay after the SMF receives the message including the PS Data Off status information of the Remote UE from the ProSe UE-to-NW Relay.

6. Sixth Example of the Disclosure of the Present Specification

A sixth example of the disclosure of the present specification will be described with reference to FIG. 16.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
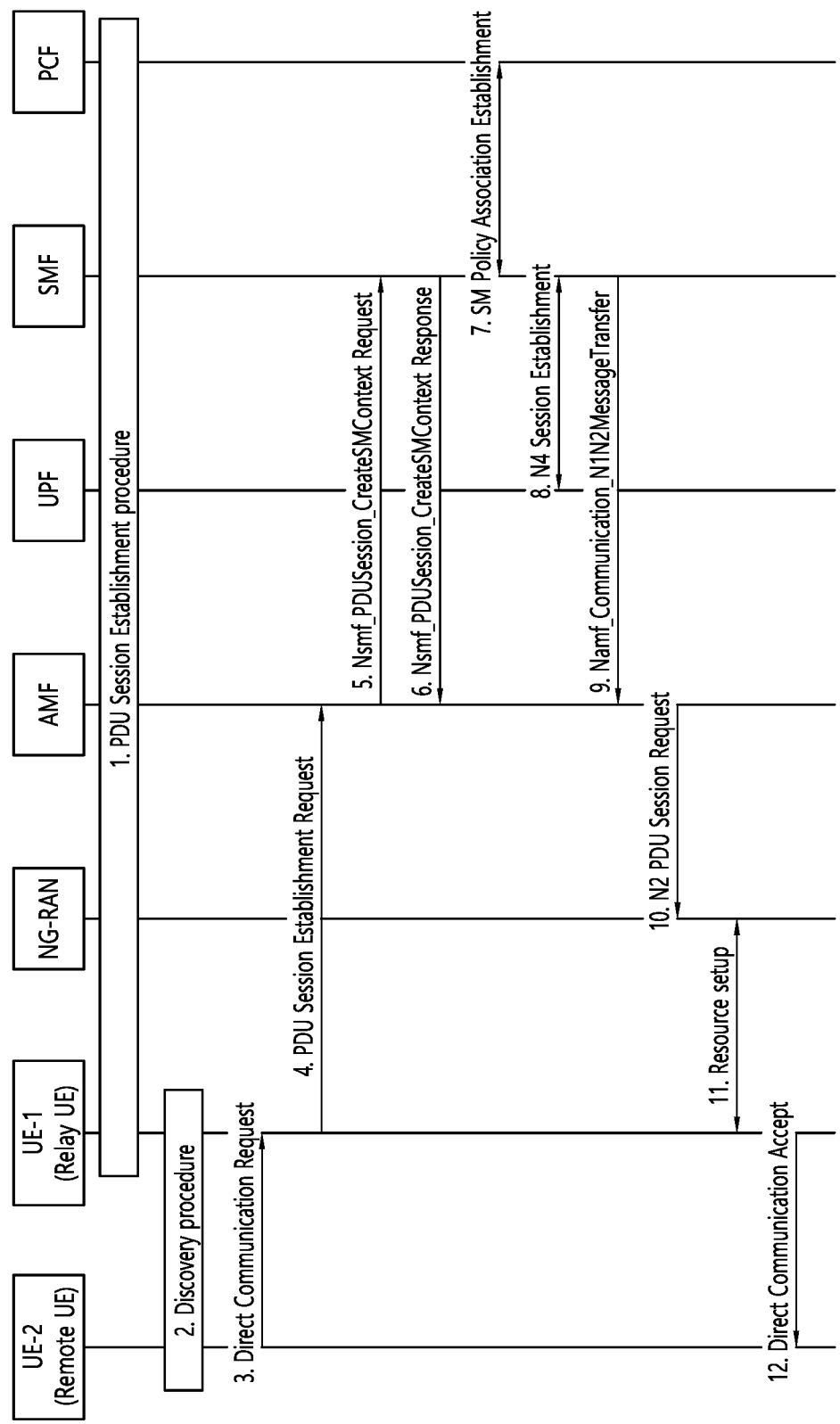
FIG. 16 shows an example of a signal flow diagram according to a sixth example of the disclosure of the present specification.

FIG. 16 shows an example of a signal flow diagram according to a sixth example of the disclosure of the present specification.

Referring to FIG. 16, UE-2 (Remote UE), UE-1 (Relay UE), NG-RAN (eg, gNB, ng-eNB, etc.), AMF, UPF, SMF, and PCF are illustrated.

In the example of FIG. 16, it is assumed that UE-1 (Relay UE) has performed a registration procedure (eg, FIGS. 6a and 6b) for 5GS.

1) UE-1 that has performed a registration procedure (eg, FIGS. 6a and 6b) for 5GS may generate (or establish) a PDU session for a specific DNN. For example, UE-1 may perform a PDU session establishment procedure to generate (or establish) a PDU session for a specific DNN.

2) Step 2) may be performed in the same manner as step 2) of the example of FIG. 14.

For example, UE-2 (Remote UE) may perform a discovery procedure. For example, UE-2 may perform a discovery procedure to discover a UE-to-Network Relay in order to receive a network connection service. UE-2 may perform a discovery procedure and select UE-1 as a UE-to-Network Relay. Step 2) may be performed in the same manner as step 2) of FIG. 12, and the following may be additionally applied.

Additionally, while performing a discovery procedure, UE-1 may provide one or more of the following information to another UE (eg, a Remote UE such as UE-2):

2-a) PS Data Off status information of UE-1

2-b) Information indicating that PS Data Off status of Relay UE is applied or reflected to Remote UE In other words, UE-1 transmits one or more information of 2-a) and/or 2-b) to another UE (eg, a Remote UE such as UE-2) while performing the discovery procedure in step 2).

When UE-2 performs a discovery procedure and selects a UE-to-Network Relay, if the PS Data Off status of the UE-to-Network Relay is the same as the PS Data Off status of UE-2, the UE-2 may select the corresponding UE-to-Network Relay by giving higher priority to the corresponding UE-to-Network Relay than other UE-to-Network Relays having different PS Data Off status. Accordingly, UE-2 may select a UE-to-Network Relay having the same PS Data Off status as its PS Data Off status and request a network connection service from the selected UE-to-Network Relay.

In the example of FIG. 16, it is assumed that UE-2 fails to discover a UE-to-Network Relay having the same PS Data Off status as its PS Data Off status. In this situation, UE-2 may select a UE-to-Network Relay, which has a PS Data Off status different from PS Data Off status of the UE-2, capable of providing a network connection service. And, UE-2 may request a network connection service from the selected UE-to-Network Relay.

3 to 12) Steps 3) to 12) may be performed in the same manner as steps 3) to 12) of FIG. 13.

7. Seventh Example of the Disclosure of the Present Specification

A seventh example of the disclosure of the present specification will be described with reference to FIG. 17. The seventh example of the present specification may be, for example, an example describing the operation of the Relay UE described in the first to sixth examples of the disclosure of the present specification.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 17:
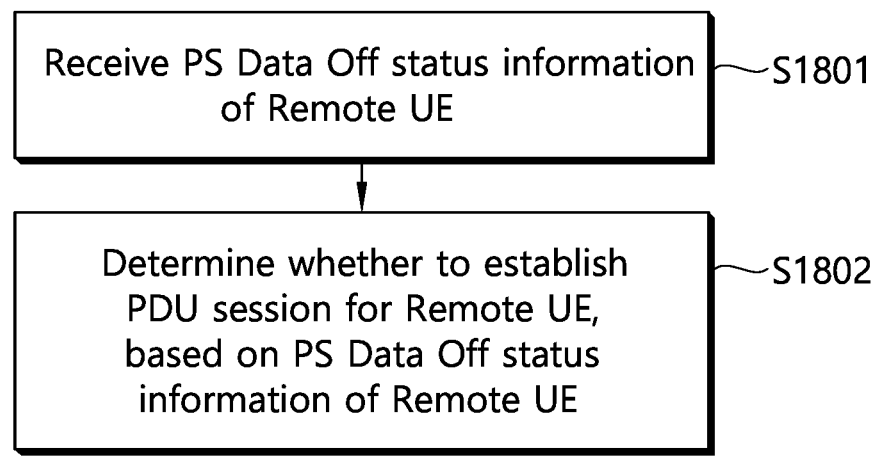
FIG. 17 shows an example of a signal flow diagram according to a seventh example of the disclosure of the present specification.

FIG. 17 shows an example of a signal flow diagram according to a seventh example of the disclosure of the present specification.

The operation of the relay UE shown in FIG. 17 is only an example, and the relay UE may also perform an operation not shown in FIG. 17. For example, the Relay UE may perform the operations of the Relay UE according to the first to sixth examples of the disclosure described above with reference to FIGS. 11*a* and 11*b* to 16

In step S1801, the Relay UE may receive PS Data Off status information of the Remote UE. For example, the Relay UE may receive a direct communication request message including PS Data Off status information from the Remote UE. The direct communication message may include one or more of the information of i) to v), as described in step 2) of the example of FIGS. 11*a* and 11*b*. For example, the Relay UE may perform the operation as described in step 2) of the example of FIGS. 11*a* and 11*b*. For example, the procedure for receiving the direct communication message may be performed as described in step 2) of the example of FIGS. 11*a* and 11*b*, step 3) of the example of FIG. 12, step 3) of the example of FIG. 13, step 3) of the example of FIG. 14) and/or step 3) of the example of FIG. 16.

Before performing step S1801, the relay UE may perform the discovery procedure as described in step 1) of the example of FIGS. 11*a* and 11*b*, step 2) of the example of FIG. 12, step 2) of the example of FIG. 13, step 2) of the example of FIG. 14) and/or step 2) of the example of FIG. 15.

In step S1802, the Relay UE may determine whether to establish a PDU session for the Remote UE based on the PS Data Off status information of the Remote UE. For example, as in the third example of the disclosure described with reference to FIG. 13, when the PS Data Off state information of the Remote UE and the PS Data Off state information of the Relay UE are different, the Relay UE may perform a procedure for establishing a new PDU session for the Remote UE.

When the Relay UE determines to establish a PDU session for the Remote UE, the Relay UE may transmit a PDU session establishment request message to newly establish a PDU session for the Remote UE. Alternatively, the Relay UE may transmit a PDU session modification request message. The operation of the Relay UE transmitting the PDU session establishment request message and the subsequent operations may be performed in the same manner with operations of the first exmaple to sixth example of the disclosure of the present disclosure described above, such as steps 3) to 10) in the example of FIGS. 11*a* and 11*b*, steps 4) to 11) in the example of FIG. 12, and FIG. Step 4) to Step 12), Step 4) to Step 10) of FIG. 14, Step 1) to Step 5) of FIG. 15 and/or Step 4) to Step 12) of FIG. 16.

As described in the disclosure of the present specification, operations such as the following examples may be performed.

A Relay UE (UE performing a UE-to-Network Relay operation) may receive a network connection service request including PS Data Off status information of a Remote UE from another UE (UE performing a Remote UE operation).

The relay UE may transmit a PDU session related request message (eg, a PDU session establishment request message or a PDU session modification request message) including PS Data Off status information to the network (eg, AMF). For example, when the Relay UE determines to generate (or establish) a new PDU session for the Remote UE, the Relay UE may transmit a PDU session establishment request message to the network. For another example, when the Relay UE determines to change (or modify) the existing PDU session for the Remote UE, the Relay UE may transmit a PDU session modification request message to the network.

The relay UE may receive a response message to the PDU session related request message from the network. The response message may include PS Data Off support indication information.

The relay UE may transmit a response message to the network connection service request message of the Remote UE. The response message transmitted by the Relay UE to the Remote UE may include PS Data Off support indication information.

As described in the disclosure of this specification, the Relay UE and/or the network may support PS Data Off of the Remote UE. For the same DNN, PS Data Off may be applied to the Relay UE itself and the Remote UE according to the PS Data Off status of the UE, respectively.

For reference, the operation of the terminal (eg, Remote UE or Relay UE) described in this specification may be implemented by the apparatus of FIGS. 18 to 22 to be described below. For example, the terminal (eg, Remote UE or Relay UE) may be the first device 100*a* or the second device 100*b* of FIG. 19. For example, an operation of a terminal (eg, a Remote UE or a Relay UE) described herein may be processed by one or more processors 1020*a* or 1020*b*. The operations of the UE described herein may be stored in one or more memories 1010*a* or 1010*b* in the form of instructions/programs (e.g. instructions, executable code) executable by one or more processors 1020*a* or 1020*b*. One or more processors 1020*a* or 1020*b* control one or more memories 1010*a* or 1010*b* and one or more transceivers 1031*a* or 1031*b*, and may perform the operation of the terminal (eg, UE) described in the disclosure of the present specification by executing instructions/programs stored in one or more memories 1010*a* or 1010*b* as disclosed herein.

In addition, instructions for performing an operation of a terminal (eg, a Remote UE or a Relay UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, Remote UE or Relay UE) described in the disclosure of the present specification.

For reference, the operation of a network node (eg, AMF, SMF, UPF, UDM, DN, NG-RAN, etc.) or a base station (eg, NG-RAN, gNB, eNB, ng-eNB etc.) described in this specification will be may be implemented by the apparatus described below in FIGS. 18 to 21. For example, the network node may be the first device 100a or the second device 100b of FIG. 19. For example, the operation of the network node or the base station described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node or the base station described in the disclosure of the present specification by executing instructions/programs stored in one or more memories 1010a or 1010b as disclosed herein.

IV. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 18:
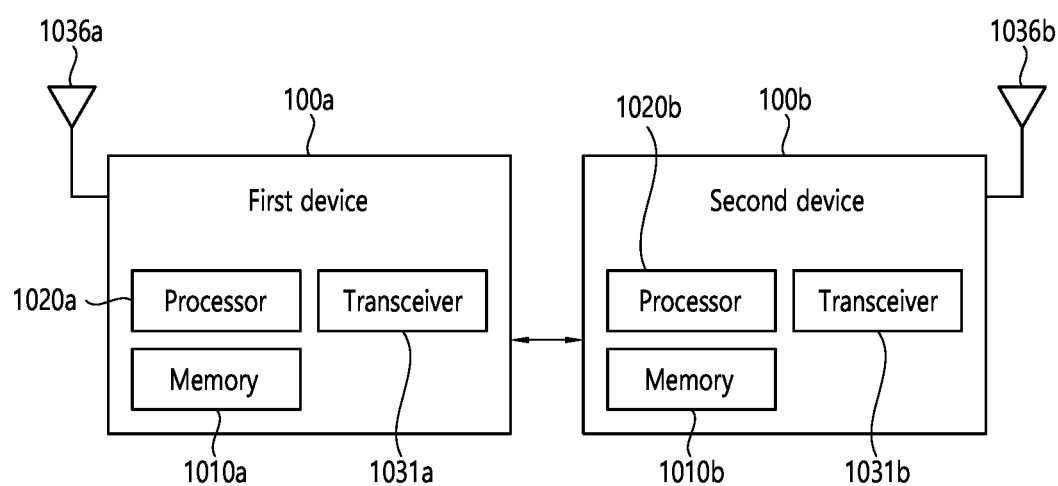
FIG. 18 illustrates a wireless communication system according to an embodiment.

FIG. 18 illustrates a wireless communication system according to an embodiment.

Referring to FIG. 18, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g., AMF or MME) described in the disclosure of the present specification. Or, the second device 100b may be a base station, a network node, a transmission terminal, a reception terminal, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100a may include at least one processor such as a processor 1020a, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 19:
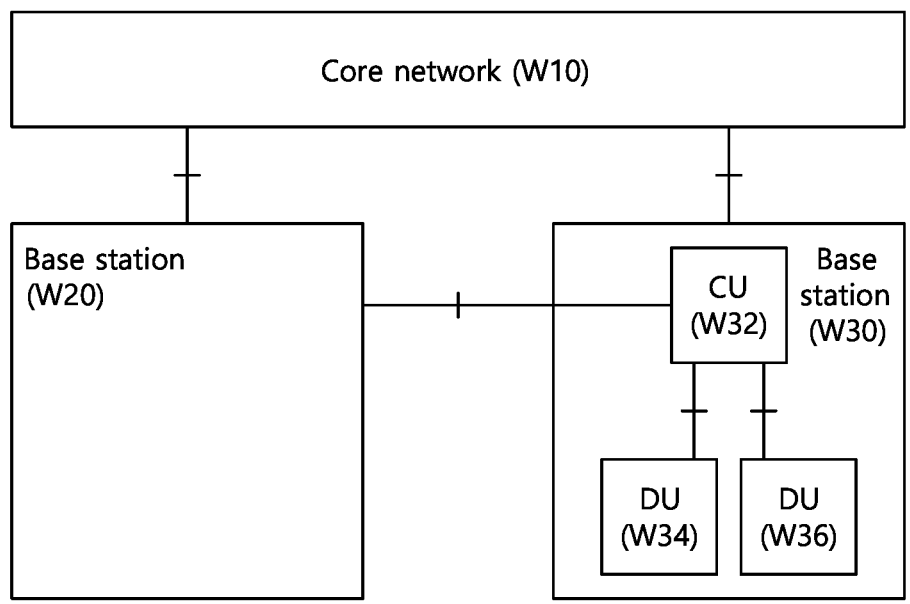
FIG. 19 illustrates a block diagram of a network node according to an embodiment.

FIG. 19 illustrates a block diagram of a network node according to an embodiment.

In particular, FIG. 19 is a diagram illustrating in detail a case in which a base station is divided into a Central Unit (CU) and a Distributed Unit (DU).

Referring to FIG. 19, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 20:
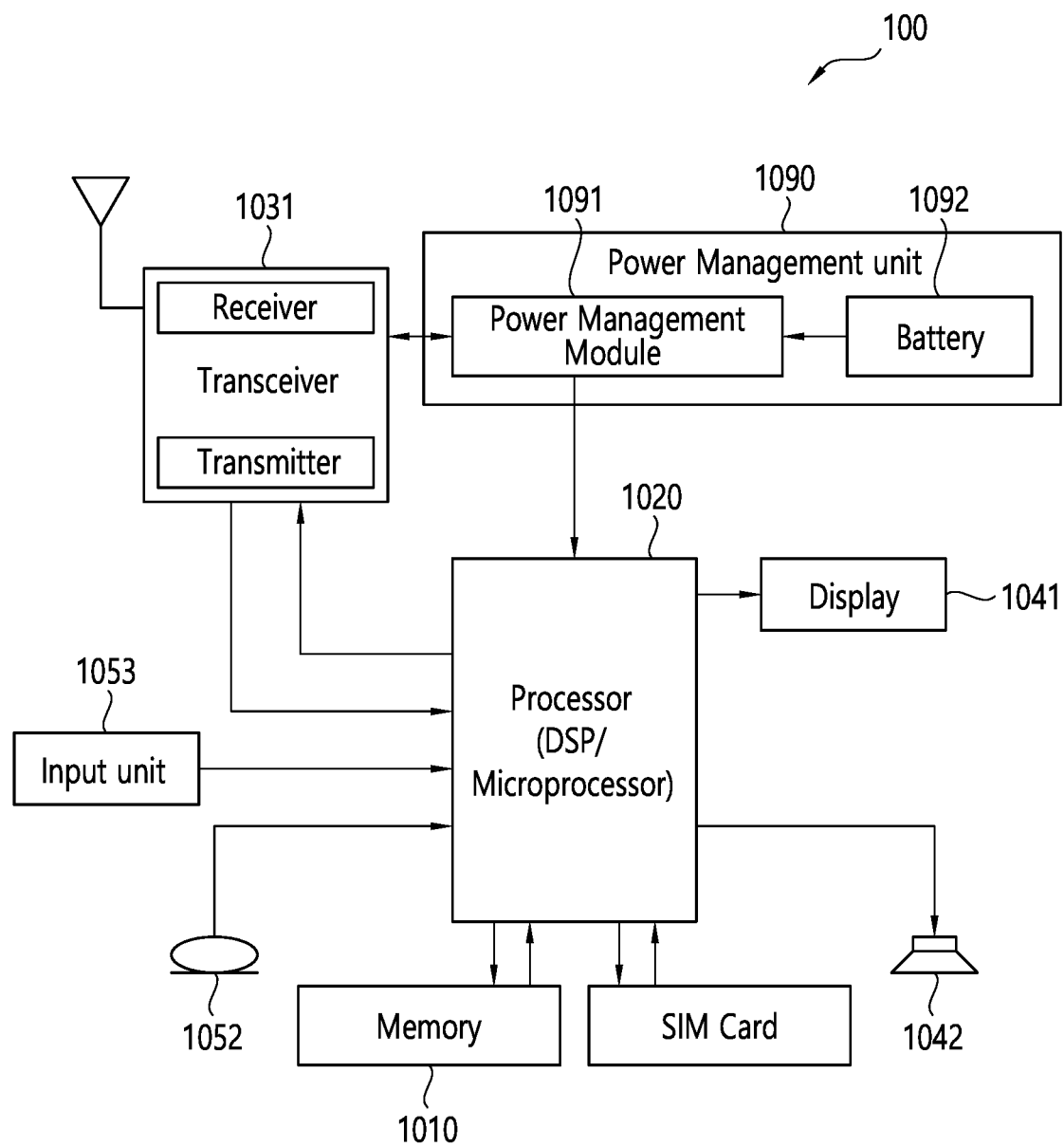
FIG. 20 is a block diagram illustrating a configuration of a UE according to an embodiment.

FIG. 20 is a block diagram illustrating a configuration of a UE according to an embodiment.

In particular, the UE 100 shown in FIG. 20 is a diagram illustrating the first device of FIG. 18 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card.

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 21:
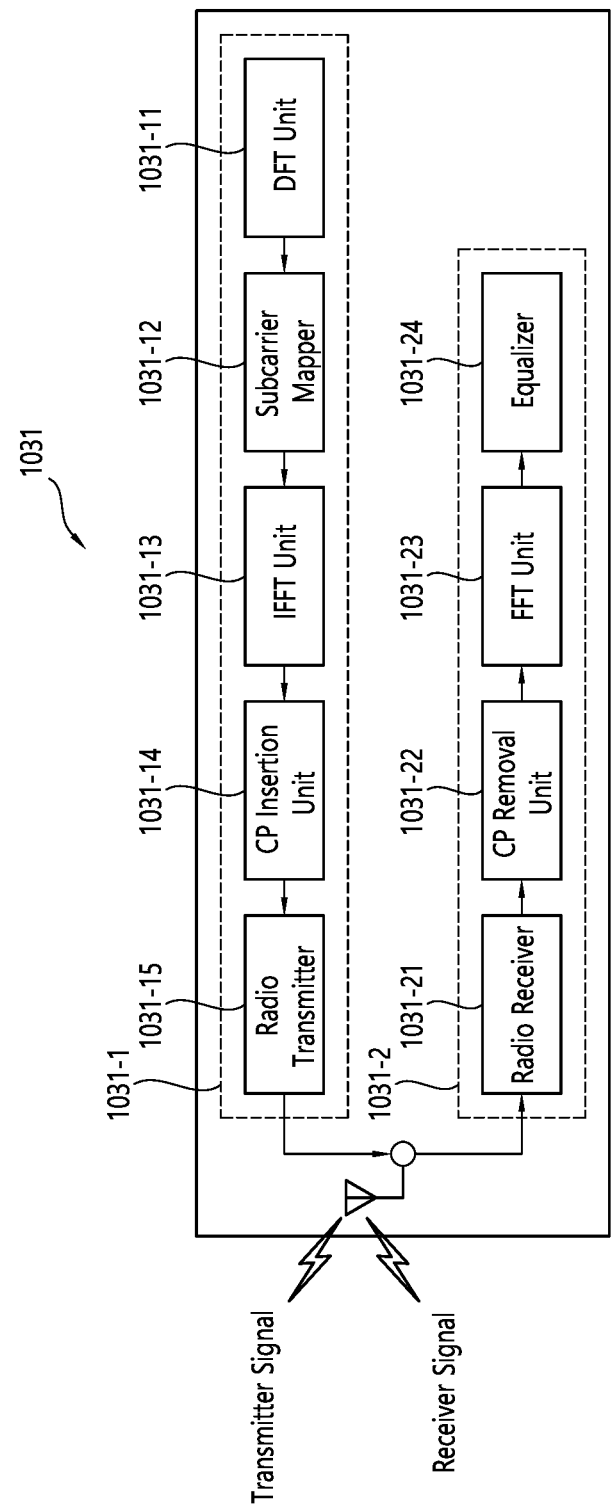
FIG. 21 is a detailed block diagram illustrating the transceiver of the first device shown in FIG. 18 or the transceiver of the device shown in FIG. 20 in detail.

FIG. 21 is a detailed block diagram illustrating the transceiver of the first device shown in FIG. 18 or the transceiver of the device shown in FIG. 20 in detail.

Referring to FIG. 21, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel.

On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 22:
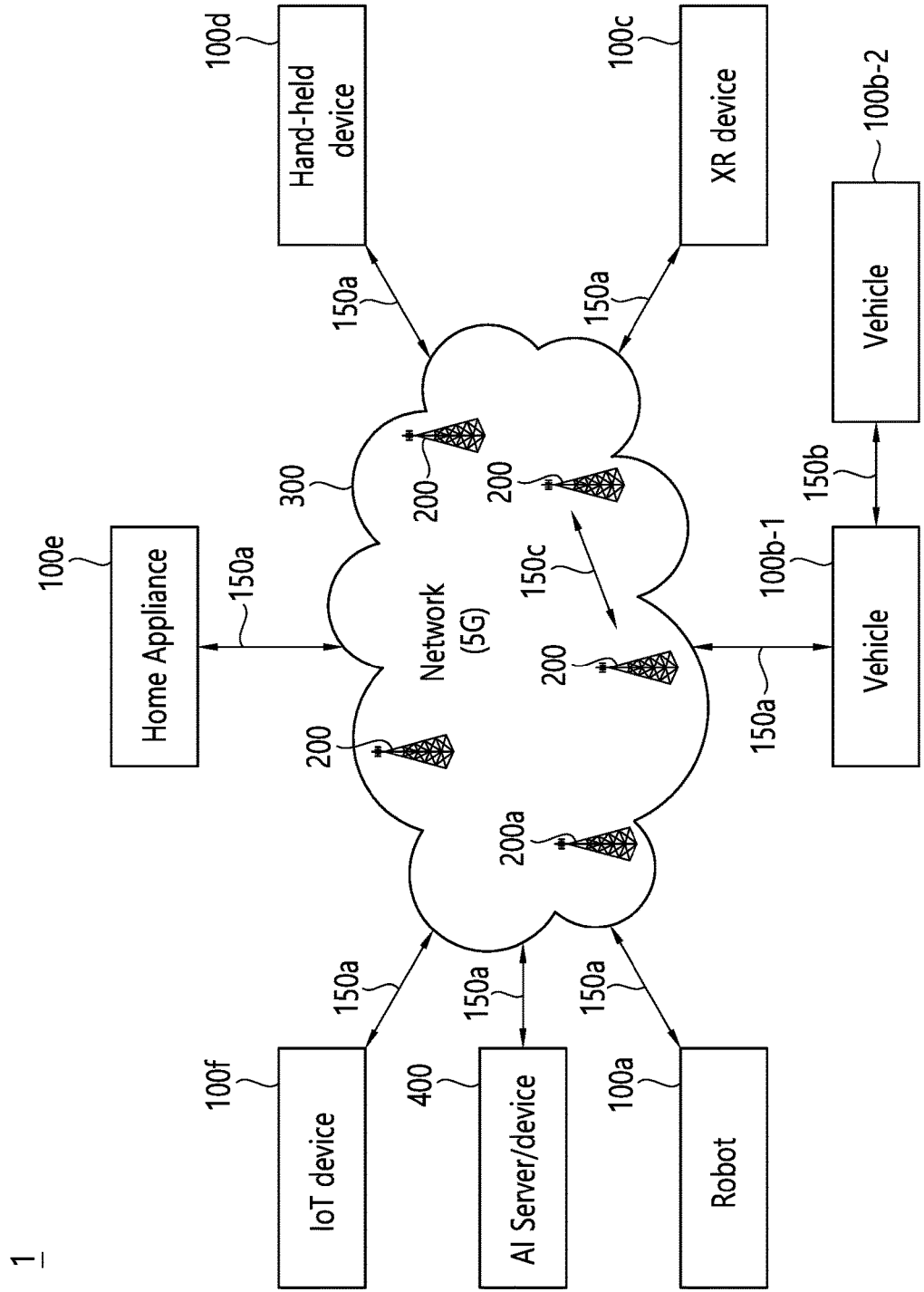
FIG. 22 illustrates a communication system 1 applied to the disclosure of the present specification.

FIG. 22 illustrates a communication system 1 applied to the disclosure of the present specification.

Referring to FIG. 22, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100*a*, a vehicle 100*b*-1, 100*b*-2, an eXtended Reality (XR) device 100*c*, a hand-held device 100*d*, and a home appliance 100*e*, an Internet-of-Things (IoT) device 100*f*, and an AI device/ server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200*a* may operate as a base station/network node to other wireless devices.

Here, the wireless communication technology implemented in the wireless devices 100*a* to 100*f*, 400, and 100 and 200 of FIG. 19 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names. Additionally or alternatively, the wireless communication technology implemented in the wireless devices 100*a* to 100*f*, 400, 100 and 200 in FIG. 19 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100*a* to 100*f*, 400, and 100 and 200 of FIG. 19 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names The wireless devices 100*a* to 100*f* may be connected to the network 300 via the base station 200. An Artificial Intelligence (AI) technology may be applied to the wireless devices 100*a* to 100*f* and the wireless devices 100*a* to 100*f* may be connected to the AI server 400 via the network 300.

The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

The following drawings were created to explain a specific example of the present specification. Since the names of specific devices or specific signal/message/field names described in the drawings are presented as examples, the technical features of the present specification are not limited to the specific names used in the following drawings.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method for performing communication related to Packet Switch (PS) Data Off, the method performed by a Relay User Equipment (UE) and comprising:
    receiving a direct communication request message from a Remote UE,
    wherein the direct communication request message includes PS Data Off state information of the Remote UE;
    determining whether to establish a Protocol Data Unit (PDU) session for the Remote UE, based on the PS Data Off status information of the Remote UE; and
    transmitting a PDU session establishment request message to a network node, based on the PDU session for the Remote UE is determined to be established.

2. The method of claim 1,
    wherein the PS Data Off status information of the Remote UE includes information indicating that the PS Data Off status of the Remote UE is deactivated or that the PS Data Off status of the Remote UE is activated.

3. The method of claim 1,
    when the PS Data Off status information of the Remote UE is different from the PS Data Off status information of the Relay UE, the PDU session for the Remote UE is determined to be established.

4. The method of claim 1,
    wherein the PDU session establishment request message includes identifier information related to the Remote UE and PS Data Off status information of the Remote UE.

5. The method of claim 1,
    wherein the direct communication request message further includes at least one of i) information related to a Data Network Name (DNN) with which the Remote UE intends to communicate, ii) PDU session type information, iii) identifier information indicating the Remote UE, and/or iv) information indicating that it is for receiving network connection service.

6. The method of claim 1, further comprising:
    receiving a PDU session establishment accept message in response to the PDU session establishment request message.

7. The method of claim 6, further comprising:
    based on that the PDU session establishment accept message is received, transmitting a direct communication accept message to the Remote UE in response to the direct communication request message.

8. A method for performing communication related to Packet Switch (PS) Data Off, the method performed by a Remote User Equipment (UE), and comprising:
    transmitting a direct communication request message to a Relay UE,
    wherein the direct communication request message includes PS Data Off status information of the Remote UE; and
    receiving a response message to the direct communication request message from the Relay UE,
    wherein the PS Data Off status information of the Remote UE is used for the Relay UE to determine establishment of a Protocol Data Unit (PDU) session for the Remote UE.

9. The method of claim 8, further comprising:
    wherein the PS Data Off state information of the Remote UE includes information indicating that the PS Data Off status of the Remote UE is deactivated or information that the PS Data Off status of the Remote UE is activated.

10. The method of claim 8,
wherein the direct communication request message further includes at least one of i) information related to a Data Network Name (DNN) with which the Remote UE intends to communicate, ii) PDU session type information, iii) identifier information indicating the Remote UE, and/or iv) information indicating that it is for receiving network connection service.

11. A Relay User Equipment (UE) for performing communication related to Packet Switch (PS) Data Off,
at least one processor; and
at least one memory storing instructions and operably electrically connectable with the at least one processor,
wherein the operations performed based on the execution of the instructions by the at least one processor include:
receiving a direct communication request message from a Remote UE,
wherein the direct communication request message includes PS Data Off state information of the Remote UE;
determining whether to establish a Protocol Data Unit (PDU) session for the Remote UE, based on the PS Data Off status information of the Remote UE; and
transmitting a PDU session establishment request message to a network node, based on the PDU session for the Remote UE is determined to be established.

12. The Relay UE of claim 11,
wherein the Relay UE is an autonomous driving device that communicates with at least one of a mobile terminal, a network, and an autonomous vehicle other than the Relay UE.

* * * * *